US010684948B2

(12) United States Patent
Sweere

(10) Patent No.: US 10,684,948 B2
(45) Date of Patent: Jun. 16, 2020

(54) DUAL INLINE MEMORY MODULE

(71) Applicant: Sanmina Corporation, San Jose, CA (US)

(72) Inventor: Paul Sweere, San Clemente, CA (US)

(73) Assignee: SANMINA CORPORATION, San Jose, CA (US)

(*) Notice: Subject to any disclaimer, the term of this patent is extended or adjusted under 35 U.S.C. 154(b) by 85 days.

(21) Appl. No.: 15/820,352

(22) Filed: Nov. 21, 2017

(65) Prior Publication Data

US 2018/0143904 A1 May 24, 2018

Related U.S. Application Data

(60) Provisional application No. 62/425,016, filed on Nov. 21, 2016.

(51) Int. Cl.
G06F 3/06 (2006.01)
G06F 12/0804 (2016.01)
G06F 11/14 (2006.01)
G06F 11/16 (2006.01)
G06F 9/4401 (2018.01)
G06F 12/0868 (2016.01)

(52) U.S. Cl.
CPC .......... G06F 12/0804 (2013.01); G06F 3/065 (2013.01); G06F 3/0619 (2013.01); G06F 3/0673 (2013.01); G06F 11/1441 (2013.01); G06F 11/1658 (2013.01); G06F 9/4401 (2013.01); G06F 12/0868 (2013.01); G06F 2201/805 (2013.01); G06F 2201/82 (2013.01); G06F 2212/1032 (2013.01); G06F 2212/2028 (2013.01)

(58) Field of Classification Search
CPC ...... G06F 11/14; G06F 11/1441; G06F 12/08; G06F 12/0804
USPC .......................................................... 714/19
See application file for complete search history.

(56) References Cited

U.S. PATENT DOCUMENTS

| 9,836,402 B1* | 12/2017 | Riel | G06F 12/0868 |
| 2011/0095783 A1* | 4/2011 | Ferolito | G06F 13/4086 326/30 |
| 2012/0271990 A1* | 10/2012 | Chen | G06F 11/1441 711/103 |
| 2013/0097369 A1* | 4/2013 | Talagala | G06F 12/0246 711/103 |
| 2016/0071552 A1* | 3/2016 | Ohwada | H02J 9/061 365/185.08 |
| 2016/0378623 A1* | 12/2016 | Kumar | G06F 3/0685 714/3 |
| 2019/0065347 A1* | 2/2019 | Mola | G06F 8/70 |

OTHER PUBLICATIONS

PCT/US2017/062891. International Search Report & Written Opinion (dated Apr. 19, 2018).

* cited by examiner

Primary Examiner — Kamini B Patel
(74) Attorney, Agent, or Firm — Loza & Loza, LLP; Julio M. Loza

(57) ABSTRACT

An apparatus and method for memory backup are disclosed as being operational at a memory module that includes a volatile memory device but which is devoid of a non-volatile memory device. The memory module can emulate operations of a non-volatile memory on the memory module while the memory module is devoid of such non-volatile memory.

16 Claims, 14 Drawing Sheets

NVDIMM-N Simplified Block Diagram

NVDIMM-NLC Simplified Block Diagram

US 10,684,948 B2

DUAL INLINE MEMORY MODULE

CROSS REFERENCE TO RELATED APPLICATIONS

This present application claims priority under 35 U.S.C. § 119(e) to U.S. Provisional Application No. 62/425,016, entitled "LOW COST NON-VOLATILE DUAL INLINE MEMORY MODULE (NVDIMM)", filed Nov. 21, 2016, and hereby expressly incorporated by reference herein.

FIELD

This application relates to systems and methods related to a low cost alternative to a non-volatile dual inline memory module (NVDIMM) that can emulate operations of an NVDIMM of an NVDIMM-N type.

BACKGROUND

Main memory in a server is typically comprised of dual inline memory modules (DIMMs) based on volatile memory devices, typically dynamic random access memory (DRAM) technology. DRAM memory is volatile memory. That is, when system power is lost, data held in the DRAM memory is lost. Some storage and server applications can benefit from non-volatile main memory solutions which retain data through a system power loss event.

It would be beneficial to provide systems and methods that could provide for low cost non-volatile main memory solutions. Such systems and methods may be used advantageously to store data in datacenters where system power outage times are short due to the use of offline power generators (typically diesel-powered) and NVDIMMs may be used to retain data for periods of time ranging from thirty minutes to a few hours (as opposed to years of retention time).

SUMMARY

A first aspect provides a memory module, comprising: (a) a substrate having an edge interface to couple to a host system; (b) a backup energy source coupled to the substrate; (c) a volatile memory device coupled to the substrate, coupled to the backup energy source, and configured to receive data from and transmit data to the host system via the edge interface; and (d) a controller coupled to the edge interface, the backup energy source, and the volatile memory device. The controller may be configured to emulate operations for non-volatile backup memory on the memory module while the memory module is devoid of such non-volatile memory. The memory module may further comprise a clock enable control logic circuit coupled to the controller, the volatile memory device, and the edge interface, wherein the controller causes the clock enable control logic circuit to monitor a host clock enable signal and mask the host clock enable signal and assert a clock enable signal to the volatile memory device when the controller deems the clock enable signal should be asserted.

In one examples, upon receiving an initialization command from the host system to initialize the volatile memory device, the controller may be further configured to: (a) ignore the initialization command if there is data stored from a previous power failure event in the volatile memory device; or (b) allow an initialization sequence to be performed on the volatile memory device if there is no data retained in the volatile memory device.

In another example, upon receiving a save command to save data from the volatile memory device to non-volatile memory, the controller may be further configured to: (a) issue a self-refresh command to the volatile memory device to ensure that data is preserved in the volatile memory device; and/or (b) issue a save complete response to indicate that data is saved in the non-volatile memory despite the memory module being devoid of non-volatile memory.

According to one aspect, during a power failure event, the controller may be further configured to hold a clock enable signal low during the power failure event to mask host system control of the clock enable signal to ensure that the volatile memory device remains in a self-refresh mode.

According yet to another feature, the controller may be further configured to identify an assertion of a hardware interrupt signal on the edge interface to detect a start of a power failure event, wherein the hardware interrupt signal is used by a host system to command the memory module to transfer data from the volatile memory device to non-volatile memory despite the memory module being devoid of non-volatile memory.

In some examples, after detection of a power failure event, the controller may be further configured to enter the memory module into a data retention state, wherein the volatile memory device is entered into a self-refresh mode, and the memory module remains in the data retention state until the controller detects a start of a boot sequence initiated by the host system, wherein the controller is further configured to transition the memory module to a data restore state. While in the data restore state, the controller may be further configured to monitor the host system accesses to the volatile memory device and ensure the volatile memory device is placed in self-refresh in a host-transparent fashion to ensure the data is preserved on the volatile memory device.

In yet another example, upon receiving a restore command from the host system to restore data from non-volatile memory to volatile memory, the controller is further configured to: (a) ignore the restore command; and/or (b) issue a restore complete response to indicate that the restore command was executed.

A second aspect provides a method, operational at a memory module including a volatile memory device but being devoid of non-volatile memory, the method including: (a) a start of a host system power failure event; and/or (b) emulating operations for non-volatile backup memory on the memory module while the memory module is devoid of such non-volatile memory. The memory module further includes a clock enable control logic circuit, the method further comprising: causing, by a memory module controller, the clock enable control logic circuit to monitor a host clock enable signal and mask the host clock enable signal and assert a clock enable signal to the volatile memory device when the memory module controller deems the clock enable signal should be asserted. The method may further comprise: (c) receiving an initialization command from a host system to initialize the volatile memory device, and (d) ignoring the initialization command if there is data stored from a previous power failure event in the volatile memory device; or (e) allowing an initialization sequence to be performed on the volatile memory device if there is no data retained in the volatile memory device.

According to one aspect, the method may further comprise: (a) receiving a save command to save data from the volatile memory device to non-volatile memory; (b) issuing a self-refresh command to the volatile memory device to ensure that data is preserved in the volatile memory device;

and/or (c) issuing a save complete response to indicate that data is saved in the non-volatile memory despite the memory module being devoid of non-volatile memory.

Another aspect provides for holding a clock enable signal low during a host system power failure event to mask host system control of the clock enable signal to ensure that the volatile memory device remains in a self-refresh mode.

Yet another feature provides for identifying an assertion of a hardware interrupt signal on an edge interface to detect the start of the host system power failure event, wherein the hardware interrupt signal is used to command the memory module to transfer data from the volatile memory device to non-volatile memory despite the memory module being devoid of non-volatile memory.

In one exemplary feature, after detecting a host system power failure event, the method may further comprise: entering the memory module into a data retention state, wherein the volatile memory device is entered into a self-refresh mode, and the memory module remains in the data retention state until the memory module detects a start of a boot sequence initiated by the host system, wherein the memory module is further configured to transition to a data restore state. While in the data restore state, the method may further comprise: monitoring the host system accesses to the volatile memory device and ensuring the volatile memory device is placed in self-refresh in a host-transparent fashion to ensure data is preserved on the volatile memory device.

In another exemplary feature, upon receiving a restore command from a host system to restore data from non-volatile memory to the volatile memory device, the method may further comprise: (a) ignoring the restore command; and/or (b) issuing a restore complete response to indicate that the restore command was executed.

DETAILED DESCRIPTION

Figure 1:
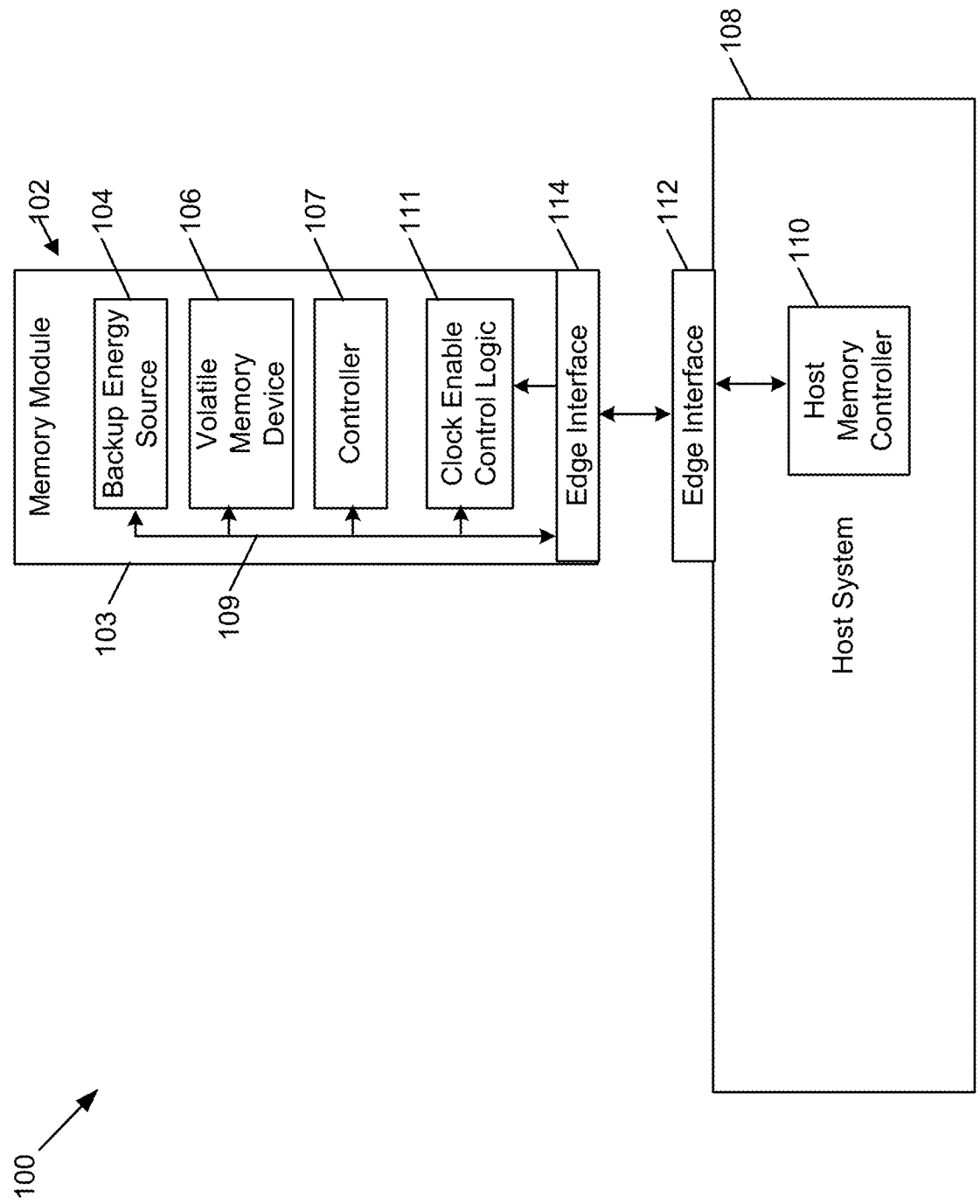
FIG. 1 is a block diagram illustrating one example of an operating environment in which a memory module including a backup energy source, volatile memory device, controller, and clock enable control logic circuit may be employed according to some aspects described herein.

The word "exemplary" or "embodiment" is used herein to mean "serving as an example, instance, or illustration." Any implementation or aspect described herein as "exemplary" or as an "embodiment" is not necessarily to be construed as preferred or advantageous over other aspects of the disclosure. Likewise, the term "aspects" does not require that all aspects of the disclosure include the discussed feature, advantage, or mode of operation.

Embodiments will now be described in detail with reference to the accompanying drawings. In the following description, numerous specific details are set forth in order to provide a thorough understanding of the aspects described herein. It will be apparent, however, to one skilled in the art, that these and other aspects may be practiced without some or all of these specific details. In addition, well known steps in a method of a process may be omitted from flow diagrams presented herein in order not to obscure the aspects of the disclosure. Similarly, well known components in a device may be omitted from figures and descriptions thereof presented herein in order not to obscure the aspects of the disclosure.

Overview

Memory modules with backup energy sources that use a volatile memory device are discussed. Some battery backed DIMM memory modules use only volatile memory, but are not suitable (without modification to the host BIOS) for use in host systems that are compliant with standardized memory modules known as NVDIMM-N memory modules. NVDIMM-N memory modules use volatile memory, but in the event of a system power failure event, the NVDIMM-N memory modules transfer data from volatile memory to non-volatile memory. This takes time and additional circuitry, beyond that of battery backed DIMM type memory modules.

A new type of memory module known as an NVDIMM-NLC memory module is disclosed herein. The NVDIMM-NLC memory module includes volatile memory but is devoid of non-volatile memory. Like the NVDIMM-N memory module, the NVDIMM-NLC memory module includes an on-board controller, but the controller is not burdened with the task of managing the movement of data between volatile and non-volatile memory devices. The NVDIMM-NLC memory module offers the benefit of lower cost and complexity, when compared to an NVDIMM-N memory module, but may be compatible with NVDIMM-N operation, with the exception of a shorter data retention time. Nevertheless, because a target use of the NVDIMM-NLC memory module is with host systems in datacenter environments, where power outages are short due to the use of offline backup power generators (typically diesel-powered), a requirement for long data retention time is not necessary. A method of using an NVDIMM-NLC memory module may include detecting a start of a host system power failure event and then emulating operations for non-volatile memory storage (e.g., emulating operations of an NVDIMM-N memory module) on the NVDIMM-NLC memory module while the NVDIMM-NLC memory module is devoid of such non-volatile memory. The NVDIMM-NLC memory module may utilize its volatile memory, which is powered by its backup energy source, to retain data stored on the volatile memory without a need to transfer the data from volatile memory to non-volatile memory during a power failure event. By emulating operations for a non-volatile memory backup module without having to transfer data from the volatile to non-volatile memory, the memory module (e.g., an NVDIMM-NLC memory module) does not need to have circuitry and programming to facilitate the transfer of the data. This saves money, in that circuitry required for an actual transfer of data is not needed. This also saves time in that no time is used to transfer data; the data is saved in place on the volatile memory and preserved using a self-refresh mode of the volatile memory.

Volatile memory devices, such as DRAM, are preferred for various reasons including their speed, however the volatile memory device has the drawback of losing data when the volatile memory device is deprived of power.

Exemplary Operating Environment

FIG. 1 is a block diagram illustrating one example of an operating environment 100 in which a memory module 102 including a backup energy source 104, a volatile memory device 106, a controller 107, and clock enable control logic 111 circuit may be employed according to some aspects described herein. The operating environment includes a host system 108. The host system 108 may include a host memory controller 110. The host memory controller 110 may interface to a host edge interface connector 112. The host edge interface connector 112 may receive an edge interface 114 of the memory module 102. The edge interface 114 of the memory module 102 may be coupled to a substrate 103 of the memory module 102. The backup energy source 104, volatile memory device 106, and controller 107 may also be coupled to the substrate 103. The backup energy source 104, volatile memory device 106, and controller 107 may communicate via a communications bus 109. In some aspects, the memory module 102 may include a clock enable control logic 111 circuit/function/module. The edge interface 114 may couple the memory module 102 to the host system 108. The edge interface 114 may provide an interface for a host data bus, address lines, control lines, host voltage lines, a system management bus (SMBUS), etc. The edge interface 114 may be compatible with a dual inline memory module form factor.

The memory device may be a volatile memory device 106, such as a DRAM. Volatile memory devices are preferred for their speed; however, the volatile memory device has the drawback of losing data when the volatile memory device is deprived of power. At least two types of memory modules with backup energy sources use a volatile memory device. The at least two types of memory modules with backup energy sources include battery backed DIMM memory modules and NVDIMM-N memory modules. A brief discussion of each of the two types of memory modules follows.

Battery Backed DIMM Memory Modules

Main memory may be implemented using a custom DIMM design, often referred to as a battery-backed DIMM memory module. Battery backed DIMM memory modules are not standardized; therefore, each manufacturer may implement its own battery backed DIMM in a way that is different from other manufacturers. Nevertheless, battery backed DIMM memory modules have some commonality.

A battery backed DIMM memory module may be similar to a standard DRAM based DIMM, but has a connection to a battery which supplies power to the DRAM during a power failure event. At the beginning of the power failure event, the DRAM is placed into "self-refresh" mode by the host memory controller using residual power remaining in the host system. The DRAM includes circuitry which ensures the memory cells are periodically refreshed while in self-refresh mode. Once host power (e.g., system power) is lost, battery power and circuitry on the battery backed DIMM ensure the DRAM remains powered up and in self-refresh mode to retain data. Thereafter, when host power is restored, the host memory controller takes the DRAM out of self-refresh mode and accesses the data.

A typical battery backed DIMM is compatible with Joint Electron Device Engineering Council (JEDEC) standard DIMMs in terms of form factor, connector pinout, and support for standard DRAM operation. However, custom system modifications are required to use the non-volatile capability of a battery backed DIMM in a server designed to work with JEDEC compatible DIMMs.

The JEDEC DIMM standard does not specify several details which are required to support a battery backed DIMM's ability to save data during power failure scenarios. The several details may include a requirement to place DRAM into self-refresh mode prior to system power loss. Another detail may include a requirement for the battery backed DIMM to have an external source of backup power. Another detail may include a requirement for the battery backed DIMM to respond to a system power failure interrupt, or detect a system power failure event directly by monitoring system voltage. Still another detail may include a requirement for the host system to distinguish between a volatile DIMM and a battery backed DIMM in "data retention" mode during the boot sequence. This is important because, if the host system treated the battery backed DIMM like a normal DIMM during the boot sequence, it may overwrite the data retained in the battery backed DIMM unwittingly, so that the data would be lost and unavailable to an application once the system boot was completed.

Figure 2:
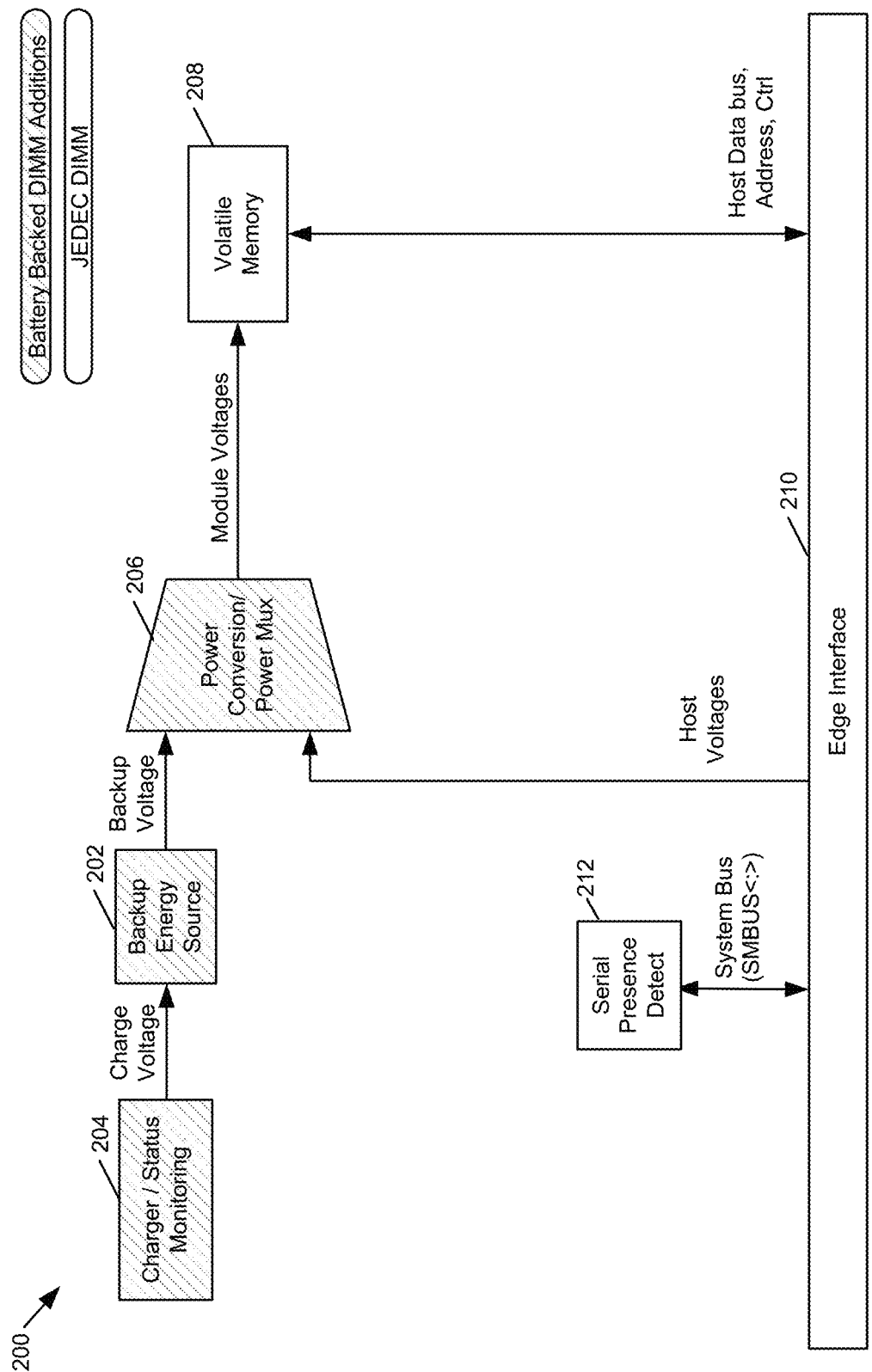
FIG. 2 is a simplified block diagram of a battery backed dual inline memory module, referred to as a battery backed DIMM, according to some aspects described herein.

FIG. 2 is a simplified block diagram of a battery backed dual inline memory module, referred to as a battery backed DIMM 200 according to some aspects described herein.

The battery backed DIMM 200 may include a backup energy source 202. The backup energy source 202 of a battery backed DIMM 200 may typically be comprised of one or more battery cells. The battery cells may be disposable or rechargeable. The battery cells require maintenance service throughout their life. The maintenance service includes replacement for both disposable and rechargeable battery cells, and cycling for rechargeable cells. The battery cells may be located on the battery backed DIMM 200 or be connected to the battery backed DIMM 200 via a cable.

The battery backed DIMM 200 may include a charger/status monitoring 204 circuit/function/module. The charger/status monitoring 204 circuit/function/module may be configured as a charging circuit for the backup energy source 202. The charger/status monitoring 204 circuit/function/module may monitor the status of the backup energy source 202 (full versus empty charge state, etc.). The charger/status monitoring 204 circuit/function/module may be located on the battery backed DIMM 200 assembly or may be located with the battery cells of the backup energy source 202 (i.e., in a separate assembly), connected to the battery backed DIMM 200 via a cable.

The battery backed DIMM 200 may include a power conversion/power multiplexor (mux), referred to as a power conversion/power mux 206 circuit/function/module. The power conversion/power mux 206 circuit/function/module may include circuitry used to convert backup energy source 202 voltage to voltages usable on the battery backed DIMM 200. The power conversion/power mux 206 circuit/function/module may also multiplex between host power and backup power of the backup energy source 202. The power conversion/power mux 206 circuit/function/module may require an external select signal to select either host power or backup energy source 202 power and steer it to the module voltage rails, or this function may be implemented with a diode load-sharing circuit that requires no external selection signal.

The battery backed DIMM 200 may include volatile memory 208 (e.g., dynamic RAM (DRAM)). When implemented as DRAM, the volatile memory 208 on a typical battery backed DIMM 200 may include at least 9 DRAM components. Mainstream DRAM technology in 2016 is DDR4. The volatile memory 208 (e.g., DRAM) interface and operation are defined by JEDEC.

The battery backed DIMM 200 may include an edge interface 210 (e.g., a DIMM edge connector). The edge interface 210 may carry all of the signals between the battery backed DIMM 200 and the host system (e.g., 108, FIG. 1). The specifications of the edge interface 210 are defined by JEDEC.

The battery backed DIMM 200 may include a serial presence detect 212 (SPD) erasable programmable memory (EPROM). The serial presence detect 212 may be a small EPROM located on all JEDEC standard DIMMs. The serial presence detect 212 may allow a host to interrogate the battery backed DIMM 200 and determine the type of DIMM, the capacity, the speed, the DRAM technology used, etc. The contents of the serial presence detect 212 are defined by JEDEC.

NVDIMM-N Description

Around 2010, a new module type emerged in the industry called a non-volatile DIMM (NVDIMM), or later classified as "NVDIMM-N". NVDIMM-Ns are hybrid memory modules containing volatile memory (e.g., DRAM) and a non-volatile memory type, typically NAND flash memory. NVDIMM-Ns are "energy-backed", that is they have a connection to a supercapacitor or battery which provides power to the NVDIMM-N during system power failure events. A supercapacitor (also known as an electric double-layer capacitor (EDLC)), is a high-capacity capacitor with capacitance values ranging between about 0.1 to about 470 Farads, that bridge the gap between electrolytic capacitors and rechargeable batteries. The capacitance values may be higher or lower than those just stated without affecting the scope of this application. Supercapacitors typically store 10 to 100 times more energy per unit volume or mass than electrolytic capacitors, can accept and deliver charge much faster than batteries, and tolerate many more charge and discharge cycles than rechargeable batteries.

Unlike battery backed DIMMs, NVDIMM-Ns do not retain the data in the volatile memory during the power failure event. Instead, they execute a "SAVE" operation, where the data held in volatile memory (e.g., DRAM) is transferred into the non-volatile (e.g., NAND flash) memory. During the data transfer, the NVDIMM-N derives power from the supercapacitor or battery. Once the data transfer is complete, backup power from the supercapacitor or battery is no longer needed because the data is now resting in non-volatile memory. When system power returns, the NVDIMM-N executes a RESTORE operation, transferring the data from the non-volatile (e.g., NAND flash) memory back to the volatile (e.g., DRAM) memory during the system boot sequence. The transfer of the data takes a finite amount of time, which is, in part, dependent on the amount of data being transferred. It is estimated that it may take about 5 seconds/GB to transfer data from DRAM to flash (i.e., data SAVE time) Likewise, it is estimated that it may take about 5 seconds/GB to transfer data from flash to DRAM (i.e., data RESTORE time). Unlike battery backed DIMMs, there are new standards published by JEDEC governing the operation of NVDIMM-N in systems designed for JEDEC compatible DIMMs. The standards include JESD245A "Byte Addressable Energy Backed Interface" and JESD248 "DDR4 NVDIMM-N Design Standard."

Figure 3:
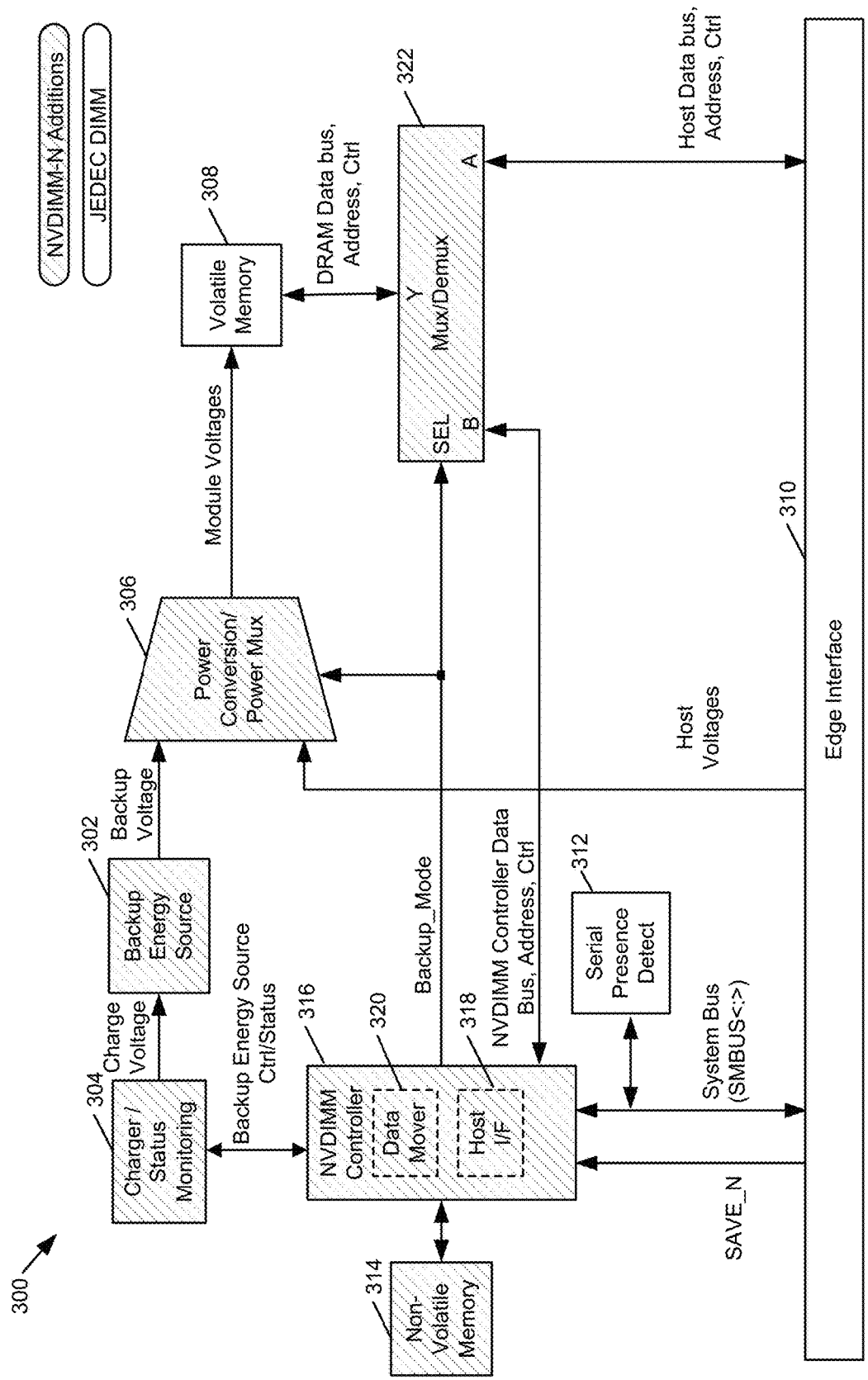
FIG. 3 is a simplified block diagram of an NVDIMM-N memory module according to some aspects described herein.

FIG. 3 is a simplified block diagram of an NVDIMM-N 300 memory module according to some aspects described herein.

The NVDIMM-N 300 may include a backup energy source 302. The backup energy source 302 may be comprised of one or more supercapacitors. These supercapacitors may be located on the NVDIMM-N 300 or be connected to the NVDIMM-N 300 via a cable.

The NVDIMM-N 300 may include a charger/status monitoring 304 circuit/function/module. The charger/status monitoring 304 circuit/function/module may be configured as a charging circuit for the backup energy source 302. The charger/status monitoring 304 circuit/function/module may monitor the status of the backup energy source 302 (full versus empty charge state, etc.). The charger/status monitoring 304 circuit/function/module may be located on the NVDIMM-N 300 assembly or may be located with the supercapacitors of the backup energy source 302 (i.e., in a separate assembly), connected to the NVDIMM-N 300 via a cable.

The NVDIMM-N 300 may include a power conversion/power multiplexor (mux), referred to as a power conversion/power mux 306 circuit/function/module. The power conversion/power mux 306 circuit/function/module may include circuitry used to convert backup energy source 302 voltage to voltages usable on the NVDIMM-N 300. The power conversion/power mux 306 circuit/function/module may also multiplex between host power and backup power of the backup energy source 302. The power conversion/power mux 306 circuit/function/module may require an external select signal to select either host power or backup energy source 202 power and steer it to the module voltage rails, or this function may be implemented with a diode load-sharing circuit that requires no external selection signal.

The NVDIMM-N 300 may include volatile memory 308 (e.g., dynamic RAM (DRAM)). When implemented as DRAM, the volatile memory 308 on a typical NVDIMM-N 300 may include at least 9 DRAM components. Mainstream DRAM technology in 2016 is DDR4. The volatile memory 308 (e.g., DRAM) interface and operation are defined by JEDEC.

The NVDIMM-N 300 may include an edge interface 310 (e.g., a DIMM edge connector). The edge interface 310 may carry all of the signals between the NVDIMM-N 300 and the host system (e.g., 108, FIG. 1). The specifications of the edge interface 310 are defined by JEDEC.

The NVDIMM-N 300 may include a serial presence detect 312 (SPD) erasable programmable memory (EPROM). The serial presence detect 312 may be a small EPROM located on all JEDEC standard DIMMs. The serial presence detect 312 may allow a host to interrogate the NVDIMM-N 300 and determine the type of DIMM, the capacity, the speed, the DRAM technology used, etc. The contents of the serial presence detect 312 are defined by JEDEC.

The NVDIMM-N may also include additional circuits/functions/modules including the following additional components.

The NVDIMM-N 300 may include non-volatile memory 314. Typically, NAND flash memory is used in an NVDIMM-N 300.

The NVDIMM-N 300 may include an NVDIMM Controller 316. The NVDIMM Controller 316 may typically be a field programmable gate array (FPGA) or an application specific integrated circuit (ASIC) and typically includes a microcontroller and firmware. The NVDIMM Controller 316 may have at least two functions on the NVDIMM-N 300. The first function may be to provide a host control and status interface (which may be referred to as a host I/F 318), which the host system uses to issue commands to the NVDIMM-N 300 and monitor the status of the NVDIMM-N 300. The second function may be to provide a data movement engine (which may be referred to as a data mover 320), which is used to transfer data between on-board volatile memory 308 (e.g., DRAM) and the on-board non-volatile memory 314 (e.g., NAND flash memory).

The NVDIMM-N 300 may also include a multiplexor/demultiplexor (mux/demux) circuit/function/module, referred to herein as a mux/demux 322 circuit/function/module. The mux/demux 322 circuit/function/module may provide an alternate path to volatile memory 308 from the memory controller located on the NVDIMM Controller 316. The "alternate path" refers to a second port to the volatile memory 308 (e.g., DRAM) dedicated to the NVDIMM Controller 316 DRAM controller. In effect, the mux/demux 322 circuit/function/module makes the volatile memory 308 (e.g., DRAM) a "dual port" memory. The NVDIMM Controller 316 performs the "data mover" function (transfer of data between flash and DRAM). To do that, the NVDIMM Controller 316 includes two memory controllers. One memory controller is a volatile memory 308 (e.g., DRAM) controller which communicates with the volatile memory 308 (e.g., DRAM) chips through the mux/demux 322 circuit/function/module. The second memory controller is a flash memory controller, which communicates with the non-volatile memory 314 (e.g., flash memory chips). The NVDIMM Controller 316 includes an internal data path connecting these two memory controllers together. During a SAVE or RESTORE operation, data flows between the volatile memory 308 and the NVDIMM Controller 316 (to/from the non-volatile memory 314) through the mux/demux 322 circuit/function/module.

In general, NVDIMM-N 300 solutions have replaced battery backed DIMM 200 solutions in the marketplace due to several inherent advantages. A first advantage is that NVDIMM-N's tend to use supercapacitors versus batteries for backup energy and therefore are safer and more environmentally friendly. Additionally, a supercapacitor charges more quickly than a battery, which means that an NVDIMM-N can come back online more quickly than a battery backed DIMM. A second advantage may be that NVDIMM-Ns support data retention approaching 10 years. Battery backed DIMMs only preserve the data as long as the battery has power, which is typically no more than 72 hours. A third advantage may be that NVDIMM-Ns are now JEDEC standards-based and supported in a broader array of system platforms from multiple suppliers than battery backed DIMMs.

NVDIMM-N has at least one disadvantage relative to battery backed DIMMs—they have a higher cost due to their higher circuit complexity. NVDIMM-N requires additional expensive components not required on a battery backed DIMM, including the NVDIMM Controller 316, non-volatile memory 314, and the mux/demux 322 components.

NVDIMM-NLC Memory Module Description

One of the advantages that an NVDIMM-N 300 holds over a battery backed DIMM 200 is the data retention time. However, this advantage may be moderating for some application environments such as datacenters. Most modern datacenters have backup power systems such as diesel generators which supply power to the host system in the event that grid power is lost. Thus, host system power outage time is limited to a few minutes until backup power generators are started.

This disclosure reflects an opportunity to develop a new non-volatile memory module type referred to herein as an "NVDIMM-N Low Cost," or "NVDIMM-NLC" memory module. The NVDIMM-NLC memory module may find utility in many host systems, for example in host systems in datacenters which have reliable sources of backup power for their respective host systems. The NVDIMM-NLC memory module may combine aspects of NVDIMM-N and battery backed DIMMs to offer a lower cost alternative to the NVDIMM-N.

The characteristics of NVDIMM-NLC memory module include the aspect that like a battery backed DIMM, data is retained in volatile memory (e.g., DRAM) in self-refresh mode during a system power failure event. Consequently, there is no requirement for a complex NVDIMM Controller 316 with data movement functionality, non-volatile memory 314 (e.g., NAND flash), nor the mux/demux 322 components typical of an NVDIMM-N 300. This simplifies the NVDIMM-NLC memory module physical design and brings the cost more in line with a battery backed DIMM.

The characteristics of an NVDIMM-NLC memory module may also include the aspect that supercapacitors are used instead of batteries as found in a battery backed DIMM. This makes an NVDIMM-NLC memory module safer and more environmentally friendly than a battery backed DIMM. Using supercapacitors, the data retention time is several minutes to hours, which is shorter than a battery backed DIMM and NVDIMM-N, but long enough for environments, such as a datacenter environment, where the datacenter has reliable backup power generation that may be activated within minutes of a detected host-system power failure.

The characteristics of NVDIMM-NLC memory module may further include the aspect of an optional NVDIMM-N compatibility mode. In the optional NVDIMM-N compatibility mode, the NVDIMM-NLC memory module could emulate operations of an NVDIMM-N. This gives the NVDIMM-NLC memory module much broader system compatibility than a battery backed DIMM because it can be used in any system that is compatible with NVDIMM-N.

Figure 4:
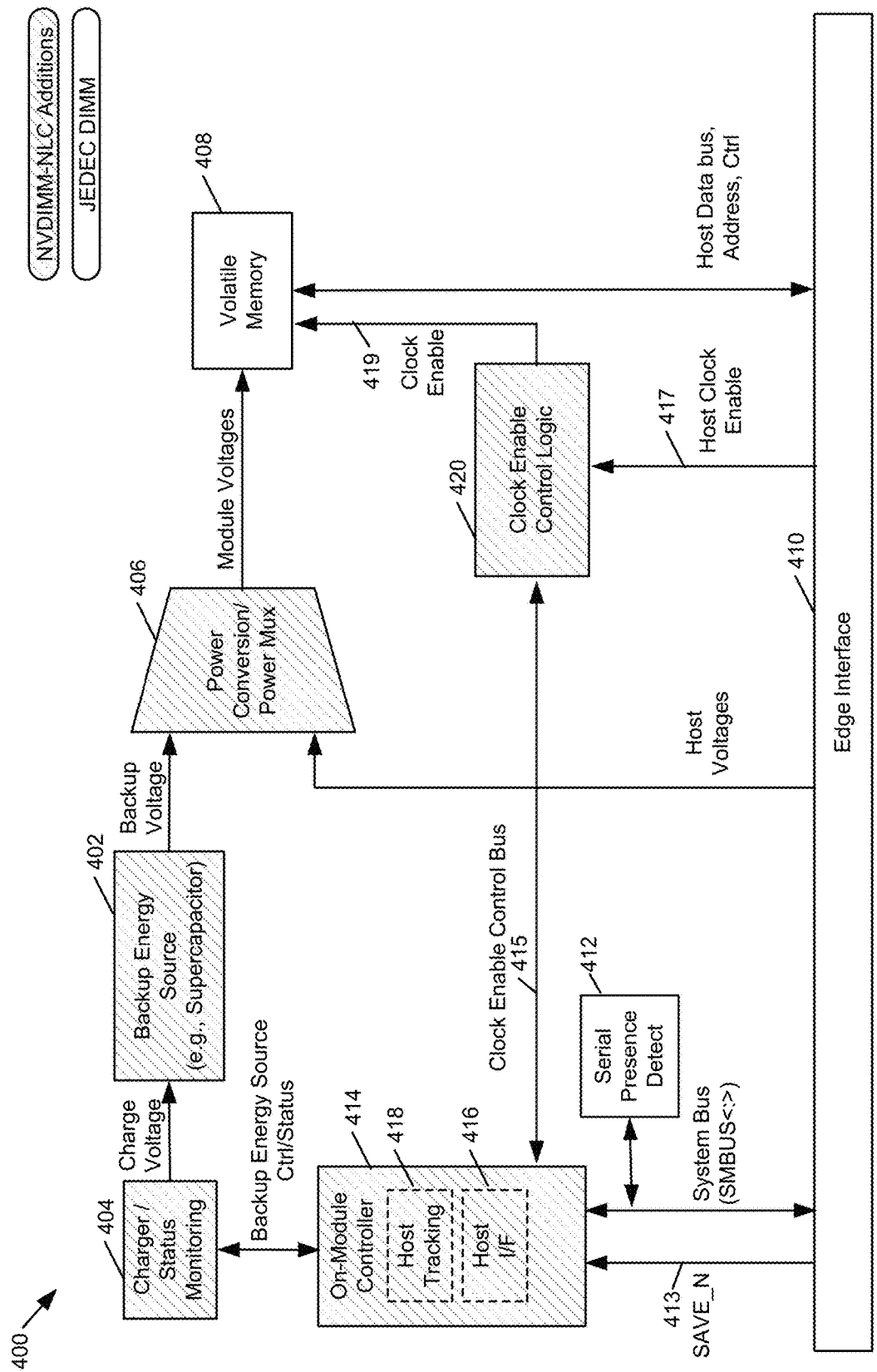
FIG. 4 is a simplified block diagram of an NVDIMM-NLC memory module according to some aspects described herein.

FIG. 4 is a simplified block diagram of an NVDIMM-NLC memory module 400 according to some aspects described herein.

The NVDIMM-NLC memory module 400 may include a backup energy source 402. The backup energy source 402 may be comprised of one or more supercapacitors. These supercapacitors may be located on the NVDIMM-NLC memory module 400 or be connected to the NVDIMM-NLC memory module 400 via a cable. If located on the NVDIMM-NLC memory module 400, the supercapacitors may be soldered (i.e., permanently affixed electrically and mechanically) to the NVDIMM-NLC memory module 400 (e.g., soldered to the substrate 103, FIG. 1 of the memory module).

The NVDIMM-NLC memory module 400 may include a charger/status monitoring 404 circuit/function/module. The charger/status monitoring 404 circuit/function/module may be configured as a charging circuit for the backup energy source 402. The charger/status monitoring 404 circuit/function/module may monitor status of the backup energy source 402 (full versus empty charge state, etc.). The charger/status monitoring 404 circuit/function/module may be located on the NVDIMM-NLC memory module 400 assembly with the backup energy source 402 (e.g., supercapacitor).

The NVDIMM-NLC memory module 400 may include a power conversion/power multiplexor (mux), referred to as a power conversion/power mux 406 circuit/function/module. The power conversion/power mux 406 circuit/function/module may include circuitry used to convert backup energy source 402 voltage to voltages usable on the NVDIMM-NLC memory module 400. The power conversion/power mux 406 circuit/function/module may also multiplex between host power and backup power of the backup energy source 402. The power conversion/power mux 406 circuit/function/module may require an external select signal to select either host power or backup energy source 402 power and steer it to the module voltage rails, or this function may be implemented with a diode load-sharing circuit that requires no external selection signal.

The NVDIMM-NLC memory module 400 may include volatile memory 408 (e.g., dynamic RAM (DRAM)). In some aspects, the NVDIMM-NLC memory module 400 may include only volatile memory 408. In some aspects, the NVDIMM-NLC memory module 400 may be devoid of non-volatile memory. When implemented as DRAM, the volatile memory 408 on an NVDIMM-NLC memory module 400 may include at least 9 DRAM components. Mainstream DRAM technology in 2016 is DDR4. The volatile memory 408 (e.g., DRAM) interface and operation are defined by JEDEC.

The NVDIMM-NLC memory module 400 may include an edge interface 410 (e.g., a DIMM edge connector). The edge interface 410 may carry all of the signals between the NVDIMM-NLC memory module 400 and the host system (e.g., 108, FIG. 1). The specifications of the edge interface 410 are defined by JEDEC. The NVDIMM-NLC memory module 400 may make use of the SAVE_N 413 signal, which is now part of the JEDEC DIMM edge connector specification and required for NVDIMM-N functionality. SAVE_N 413 may be understood to represent a hardware interrupt signal generated by the host system commanding the NVDIMM-NLC memory module 400 to save data. The NVDIMM-NLC memory module 400 saves the data in volatile memory 408 (e.g., DRAM)—the NVDIMM-NLC memory module 400 may be devoid of non-volatile memory. In other words, the NVDIMM-NLC memory module 400 (or the on-module controller 414) may be configured to identify an assertion of a hardware interrupt signal on the edge interface 410 to detect a start of the power failure event, wherein the hardware interrupt signal is used to command the memory module 400 to transfer data from the volatile memory 408 device to non-volatile memory despite the memory module being devoid of non-volatile memory. In some aspects, the volatile memory 408 device may be configured to receive data from and transmit data to a host system (e.g., 108, FIG. 1) via the edge interface 410.

The NVDIMM-NLC memory module 400 may include a serial presence detect 412 (SPD) erasable programmable memory (EPROM). The serial presence detect 412 may be a small EPROM located on all JEDEC standard DIMMs. The serial presence detect 412 may allow a host to interrogate the NVDIMM-NLC memory module 400 and determine the type of DIMM, the capacity, the speed, the DRAM technology used, etc. The contents of the serial presence detect 412 are defined by JEDEC.

The NVDIMM-NLC memory module 400 may include an on-module controller 414 (OMC). The on-module controller 414 may be a complex programmable logic device (CPLD) or small microcontroller running firmware. The on-module controller 414 may have at least two functions on the NVDIMM-NLC memory module 400. The first function of the on-module controller 414 may be to provide an NVDIMM-N compatible status/control interface to the host system (which may be referred to as a host I/F 416). The second function of the on-module controller 414 may be to track the state of volatile memory 408 and host memory controller (e.g., 110, FIG. 1) interaction (which may be referred to as host tracking 418) to ensure, for example, that data is retained during the host system boot sequence.

The NVDIMM-NLC memory module 400 may include a clock enable control logic 420 circuit/function/module. The clock enable control logic 420 circuit/function/module may interface to the on-module controller 414 via a clock enable control bus 415. The clock enable control logic 420 circuit/function/module may interface to the edge interface 410 via a host clock enable line 417 and may interface to the volatile memory 408 via a clock enable line 419. The clock enable control logic 420 circuit/function/module may include circuitry that enables the on-module controller 414 to monitor a host clock enable signal. The host clock enable signal may be a signal generated by the host system. The host clock enable signal may, in certain synchronous memory devices, be a logic level input that enables a clock input and allows it to fulfill its destined function. By monitoring the host clock enable signal, the on-module controller 414 (i.e., the memory module controller) may mask the monitored host clock enable signal and assert a clock enable signal to the volatile memory 408 when the on-module controller 414 deems the clock enable signal should be asserted (as opposed to when the host system deems the clock enable signal should be asserted). For example, the on-module controller 414 may be configured to hold the clock enable signal low during a power failure event to mask host system control of the clock enable signal to ensure that the volatile memory 408 remains in a self-refresh mode. The clock enable control bus 415 may also include signals coupled to the volatile memory 408 that, when asserted, may cause the volatile memory 408 to enter a self-refresh mode.

According to aspects described herein, an NVDIMM-NLC memory module 400 using a supercapacitor instead of a battery on a battery backed DIMM-like DIMM architecture may result in a memory module that provides "transient" or "short term" non-volatility. That is, data may be saved on the NVDIMM-NLC memory module for periods of time that are short compared to battery backed DIMM and NVDIMM-N memory modules, but long enough to maintain the data in situations where there is a reasonably good probability that host system power will be promptly restored after a power failure event. Non-volatility may be desired to preserve data in a memory module when system power from a host system is interrupted. The duration of the "transient"

or "short term" non-volatility may range from about thirty minutes to several hours for an NVDIMM-NLC memory module according to some aspects described herein. Although NVDIMM-N memory modules may provide longer periods of non-volatility (e.g., 10 years), their cost and complexity are greater than NVDIMM-NLC memory module types as described herein. For applications such as datacenters, which have robust backup power systems in place, long periods of non-volatility are not required—thirty minutes to several hours is more than adequate for such applications of NVDIMM-NLC memory modules.

In some aspects, the backup energy source 402 of the NVDIMM-NLC memory module 400 may be permanently affixed to a circuit board of the NVDIMM-NLC memory module 400. In some aspects, the backup energy source 402 may be soldered to the circuit board of the NVDIMM-NLC memory module 400.

In some aspects, an NVDIMM-NLC memory module 400 may detect a first access to a serial presence detect 412 EPROM and use this to indicate to the on-module controller 414 the start of the host system boot sequence.

In some aspects, the NVDIMM-NLC memory module may be considered as a battery backed DIMM-like device. Adding an on-module controller (e.g., on-module controller 414) to a battery backed DIMM may provide a status/control interface to the host system (which may be referred to as a host I/F 416). Optionally, this status/control interface can operate in NVDIMM-N compatibility mode per JEDEC standard JESD245, enabling an NVDIMM-NLC memory module to emulate operations of an NVDIMM-N and to work in systems compatible with NVDIMM-N.

In some aspects, the on-module controller 414 of the NVDIMM-NLC memory module 400 may respond appropriately to NVDIMM-N related commands from the host in order to emulate operations of an NVDIMM-N and progress through a standard boot sequence while ensuring data in the volatile memory 408 (e.g., DRAM) is preserved during the boot sequence. For example, in response to a RESTORE command from the host system (e.g., 108, FIG. 1), the on-module controller 414 can respond almost immediately with a "RESTORE Complete" status indication to the host system, because the data is already held in the volatile memory 408 (e.g., DRAM) (e.g., no time is needed to transfer data from flash to DRAM as on a conventional NVDIMM-N).

In some aspects, the on-module controller 414 of the NVDIMM-NLC memory module 400 may monitor the host memory controller (e.g., 110, FIG. 1) (e.g., monitor the host system) access to the volatile memory 408 (e.g., DRAM) and track the volatile memory state (e.g., DRAM state) with the purpose of preserving volatile memory 408 data during the system boot sequence. According to one example, the on-module controller 414 may do this by selectively masking host memory controller commands to the volatile memory 408 and, in a host-transparent fashion, opportunistically issuing self-refresh commands to the volatile memory 408 to ensure data is preserved. That is, the on-module controller 414 (i.e., the controller) may be configured to selectively mask host memory controller commands to the volatile memory 408 device to preserve data on the volatile memory 408 device.

Figure 5:
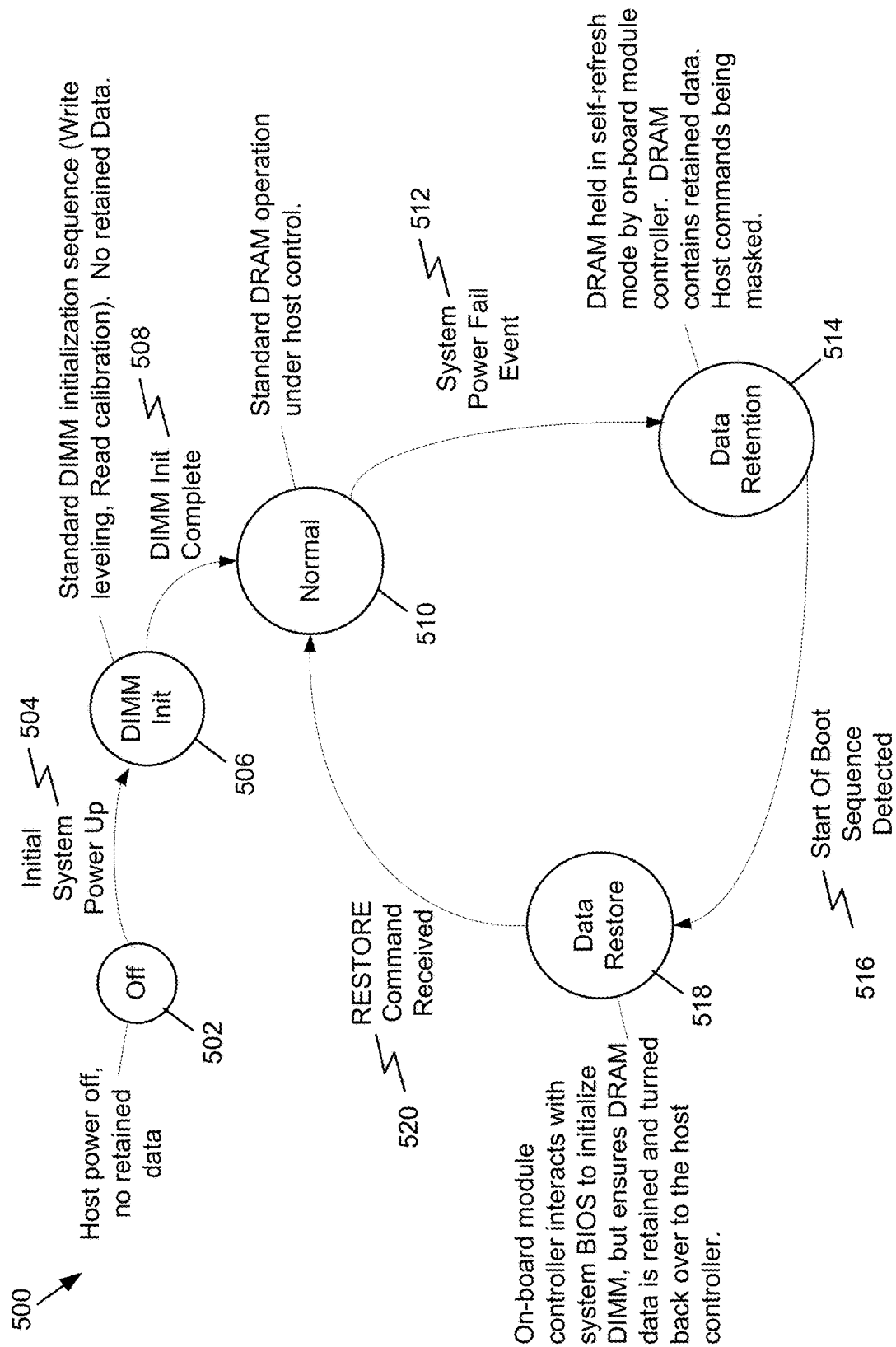
FIG. 5 illustrates a state diagram depicting several high level operating states of an NVDIMM-NLC memory module according to some aspects described herein.

FIG. 5 illustrates a state diagram 500 depicting several high level operating states of an NVDIMM-NLC memory module according to some aspects described herein. In one example, the state diagram may be implemented by the NVDIMM-NLC memory module 400 of FIG. 4.

In an Off state 502, no host power is applied to the NVDIMM-NLC memory module and there is no data saved in the volatile memory (e.g., DRAM). The volatile memory may be implemented by the volatile memory 408 of the NVDIMM-NLC memory module 400.

At 504 there may be an initial system power up.

In a DIMM Init state 506, the host system BIOS executes a standard DIMM initialization sequence on the NVDIMM-NLC memory module (e.g. write leveling, read calibration, etc.) to initialize the volatile memory device. The on-module controller is idle and does not attempt to control the volatile memory. The on-module controller may be implemented by the on-module controller 414 of the NVDIMM-NLC memory module 400. There is no retained data in the volatile memory. Module power is supplied by the host during this state.

At 508 the DIMM Init state is complete.

In a Normal state 510, the volatile memory is entirely under host control. The on-module controller does not attempt to control the volatile memory unless or until a power failure event occurs. The module is being powered from the host system.

At 512, a system power failure event occurs. According to one aspect, the on-module controller would detect the start of a power failure event by watching for (e.g., monitoring) the assertion of the SAVE_N signal (413, FIG. 4) (normally used on NVDIMM-N by the host to command the NVDIMM-N to transfer data from DRAM to flash). In other words, in some aspects, the SAVE_N signal is used to command a memory module to transfer data from volatile memory to non-volatile memory. In one example, upon determining that the SAVE_N signal is asserted (e.g., upon receiving a save command to save data from the volatile memory device to non-volatile memory), the controller (e.g., on-module controller and/or host system controller) may be configured to issue a self-refresh command to the volatile memory device to ensure that data is preserved in the volatile memory device, and to issue a save complete response to indicate that data is saved in the non-volatile memory despite the memory module being devoid of non-volatile memory. Whether the host system controller or the on-module controller instructs the volatile memory device (e.g., DRAM) to enter the self-refresh mode may depend on the host system. If the host system supports NVDIMM-N, then the on-module controller can rely on the host memory controller to place the DRAM into self-refresh before host power is lost and then, shortly thereafter, assert the SAVE_N signal, indicating to the on-module controller the start of a power loss event. If the on-module controller is not in NVDIMM-N compatibility mode or is being used in a host system that does not support NVDIMM-N, then it cannot rely on the host system to place the volatile memory device (e.g., DRAM) into self-refresh mode, nor rely on the host system to assert a SAVE_N signal. Therefore, the on-module controller may detect that the power is being lost on its own by detecting when the host system voltage has dropped below a threshold and then place the volatile memory device (e.g., DRAM) into self-refresh mode.

In the Data Retention state 514, the on-module controller ensures the data held in volatile memory is retained by controlling the clock enable signal coupled to the volatile memory. Module power is being supplied by the backup energy source (e.g., supercapacitor) in this state, or from the host system if host power is available. The on-module controller may hold the clock enable signal low during the power failure event, masking the host system control of clock enable to ensure the volatile memory device (e.g., DRAM) remain in a self-refresh mode. To enter the Data Retention state 514, the on-module controller would detect the start of a power failure event by watching for (e.g., monitoring) the assertion of the SAVE_N signal (413, FIG. 4) (normally used on NVDIMM-N by the host to command the NVDIMM-N to transfer data from DRAM to flash). The NVDIMM-NLC memory module would remain in Data Retention state 514 until it detected the start of a host system boot sequence 516, at which time it would transition to the Data Restore state 518.

At 516, the NVDIMM-NLC memory module would detect the start of a host system boot sequence. There are several ways to detect the start of a boot sequence. For example, the on-module controller could detect the first command issued from the host system to the serial presence detect (412, FIG. 4) EPROM. The disclosure is not limited to this example of detection of the start of a boot sequence.

In the Data Restore state 518, after power has been restored, the host system will begin a boot sequence. Module power is being supplied by the host when in the Data Restore state 518. The backup energy source (e.g., supercapacitor) may be in a recharge cycle. During the Data Restore state 518, the on-module controller would selectively allow the host to assert the clock enable signal to the volatile memory (e.g., DRAM) to issue volatile memory commands, such as to initiate a write calibration sequence on the volatile memory. While in Data Restore state 518, the on-module controller will monitor the host system accesses to the volatile memory (e.g., DRAM) and, whenever possible, ensure the volatile memory (e.g., DRAM) are placed in self-refresh in host-transparent fashion to ensure the data is preserved on the volatile memory device.

At 520, the NVDIMM-NLC memory module may receive a RESTORE command from the host system. Once the NVDIMM-NLC memory module receives a RESTORE command from the host system BIOS, the memory module transitions to the Normal state 510, while leaving the DRAM in self-refresh mode. In one aspect, upon receiving a RESTORE command from the host system (to restore data from non-volatile memory to volatile memory), the controller (e.g., on-module controller) may be further configured to ignore the RESTORE command, and issue a restore complete response to indicate that the RESTORE command was executed. Ignoring the RESTORE command may be performed unilaterally by the controller (e.g., on-module controller).

System Using a NVDIMM-NLC Memory Module when not in NVDIMM-N Compatibility Mode

The following BIOS modifications may be used to make an NVDIMM-NLC memory module work when not operating in NVDIMM-N compatibility mode. System BIOS functionality that may be used to make an NVDIMM-NLC memory module operate correctly include an ability to discern between NVDIMM-NLC memory module and standard DIMMs during system initialization. System BIOS functionality that may be used to make an NVDIMM-NLC memory module operate correctly may also include an ability to skip DIMM initialization for NVDIMM-NLC memory modules which contain saved data. System BIOS functionality that may be used to make an NVDIMM-NLC memory module operate correctly may also include an ability to interact with the status/control interface of the NVDIMM-NLC memory module (e.g., host I/F 416, FIG. 4), such as access backup energy source health status, configure the NVDIMM-NLC memory module to save data if a power fail event occurs, etc. An NVDIMM-NLC memory module that is not configured to save data if a power fail event occurs would behave like a standard volatile DIMM; that is, if a power fail event occurs, the NVDIMM-NLC memory module would not save data. Under certain scenarios, an application may want to ensure the NVDIMM-NLC memory module will not save data. Accordingly, under certain scenarios, an NVDIMM-NLC memory module may not be configured to save data if a power fail event occurs.

Methods of Using an NVDIMM-NLC Memory Module

Figure 6:
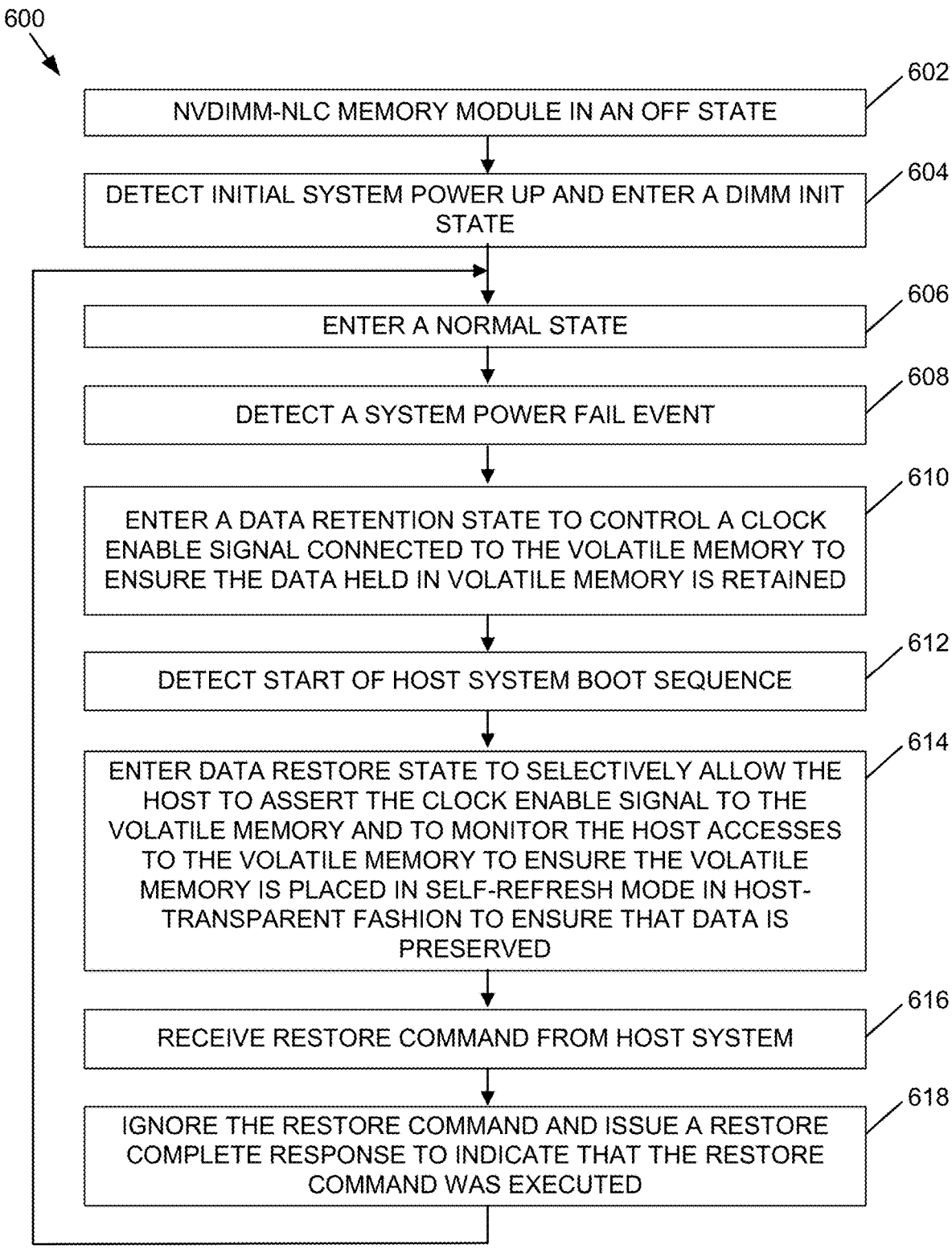
FIG. 6 is a diagram of an exemplary first method of using an NVDIMM-NLC memory module according to some aspects described herein.

FIG. 6 is a diagram of an exemplary first method 600 of using an NVDIMM-NLC memory module according to some aspects described herein. The exemplary method may be operational on a memory module that includes volatile memory but is devoid of non-volatile memory. The method may begin with the NVDIMM-NLC memory module in an Off state 602. In the Off state, no host power is applied to the NVDIMM-NLC memory module and there is no data saved in the volatile memory (e.g., DRAM). The volatile memory may be implemented by the volatile memory 408 of the NVDIMM-NLC memory module 400.

The Host system BIOS executes a standard DIMM initialization sequence on the NVDIMM-NLC memory module (e.g. write leveling, read calibration, etc.) to initialize the volatile memory device. The NVDIMM-NLC memory module detects the initial system power up and enters a DIMM Init state 604. The on-module controller is idle and does not attempt to control the volatile memory. There is no retained data in the volatile memory. Module power is supplied by the host during this state. The on-module controller may be implemented by the on-module controller 414 of the NVDIMM-NLC memory module 400.

Once the DIMM Init state is complete, the NVDIMM-NLC memory module enters a Normal state 606, the volatile memory is entirely under host control. The on-module controller does not attempt to control the volatile memory unless/until a power failure event occurs. The NVDIMM-NLC memory module is being powered from the host system.

A system power failure event may be detected by the NVDIMM-NLC memory module 608. The NVDIMM-NLC memory module may then enter a Data Retention state, wherein the on-module controller ensures the data held in volatile memory is retained by controlling the clock enable signal connected to the volatile memory 610. Module power is being supplied by the backup energy source (e.g., supercapacitor) in this state, or from the host system if host power is available. The on-module controller holds the clock enable signal low during the power failure event, masking the host's control of clock enable signal to ensure the volatile memory (e.g., DRAM) remain in self-refresh. To enter the Data Retention state (514, FIG. 5), the on-module controller would detect the start of a power failure event by, for example, watching for (e.g., monitoring) the assertion of the SAVE_N signal (413, FIG. 4) (normally used on NVDIMM-N by the host to command the NVDIMM-N to transfer data from DRAM to flash). The NVDIMM-NLC memory module would remain in Data Retention state until it detected the beginning of a new host system boot sequence, at which time it would transition to the Data Restore state (518, FIG. 5). In one aspect, after detection of the system power failure event the on-module controller (i.e., controller) is further configured to enter the memory module into a Data Retention state, wherein the volatile memory 610 device is entered into a self-refresh mode, and the memory module remains in the Data Retention state until the on-module controller (i.e., controller) detects a start of a boot sequence initiated by the host system, wherein the on-module controller (i.e., controller) is further configured to transition the memory module to a Data Restore state. In other words, the memory module remains in the Data Retention state until the memory module detects a start of a boot sequence initiated by the host system, wherein the memory module is further configured to transition to a Data Restore state.

A detection of a new host system boot sequence may occur 612. There are several ways to detect the start of a new boot sequence. For example, the on-module controller could detect the first command issued from the host system to the serial presence detect (412, FIG. 4) EPROM.

Entry into the Data Restore state 614 may occur, wherein the on-module controller would selectively allow the host to assert the clock enable signal to the volatile memory (e.g., DRAM) to issue volatile memory commands, such as to initiate a write calibration sequence on the volatile memory. While in Data Restore state, the on-module controller may monitor the host system accesses to the volatile memory (e.g., DRAM) and, whenever possible, ensure the volatile memory (e.g., DRAM) are placed in self-refresh in host-transparent fashion to ensure the data is preserved on the volatile memory device.

The NVDIMM-NLC memory module may next receive a RESTORE command from the host system 616. Once the NVDIMM-NLC memory module receives a RESTORE command from the host system BIOS, the memory module transitions to the Normal state (510, FIG. 5), while leaving the volatile memory (e.g., DRAM) in self-refresh mode. In one aspect, upon receiving a RESTORE command from the host system, the controller (e.g., on-module controller) may be further configured to ignore the RESTORE command, and issue a restore complete response to indicate that the RESTORE command was executed 618. Ignoring the RESTORE command may be performed unilaterally by the controller (e.g., on-module controller).

Figure 7:
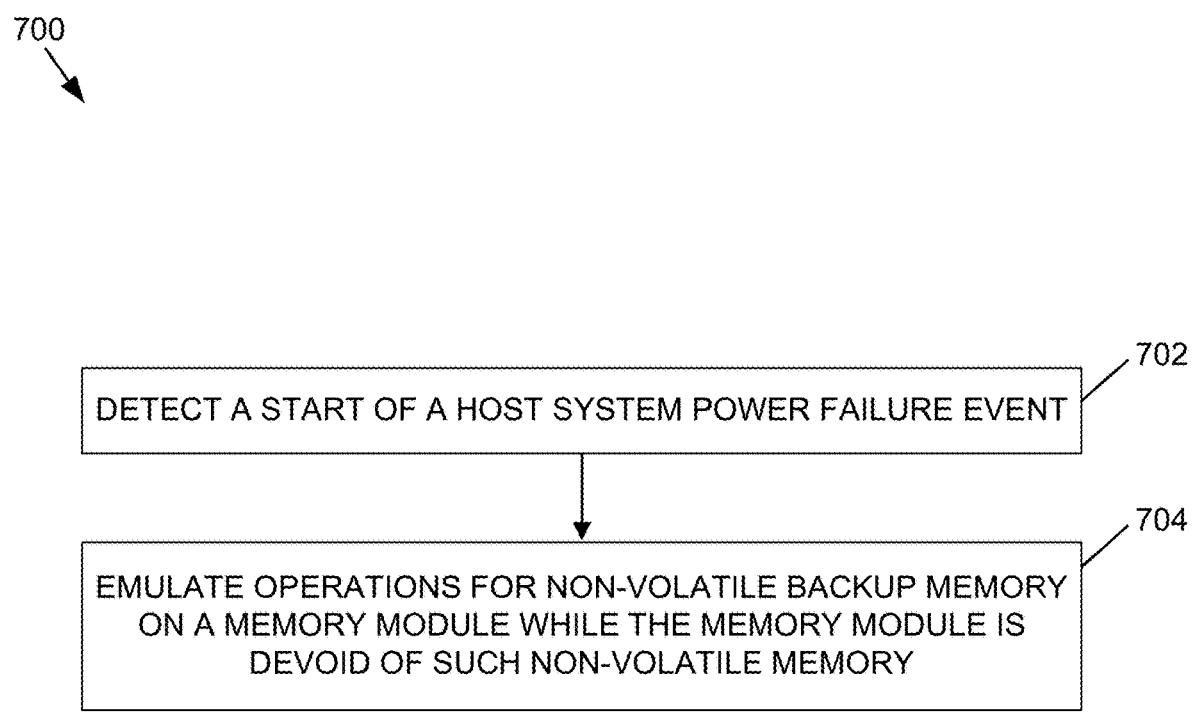
FIG. 7 is a diagram of another exemplary method of using an NVDIMM-NLC memory module according to some aspects described herein.

FIG. 7 is a diagram of another exemplary method 700 of using an NVDIMM-NLC memory module according to some aspects described herein. The exemplary method may be operational on a memory module that includes volatile memory but is devoid of non-volatile memory. The method may include detecting a start of a host system power failure event 702. The method may further include emulating operations for non-volatile backup memory on the memory module while the memory module is devoid of such non-volatile memory 704. The memory module may utilize its volatile memory, which is powered by a backup energy source (e.g., supercapacitor), to retain data stored on the volatile memory without a need to transfer the data from volatile memory to non-volatile memory at the start of and during a power failure event. By emulating operations for a non-volatile memory backup module without having to transfer data from the volatile to non-volatile memory, the memory module (e.g., an NVDIMM-NLC memory module) does not need to have circuitry and programming to facilitate the transfer of the data. This saves money, in that circuitry is not required that would be required if an actual transfer of data was needed. This also saves time in that no time is used to transfer data; the data is saved in place on the volatile memory and preserved using a self-refresh mode of the volatile memory.

Figure 8:
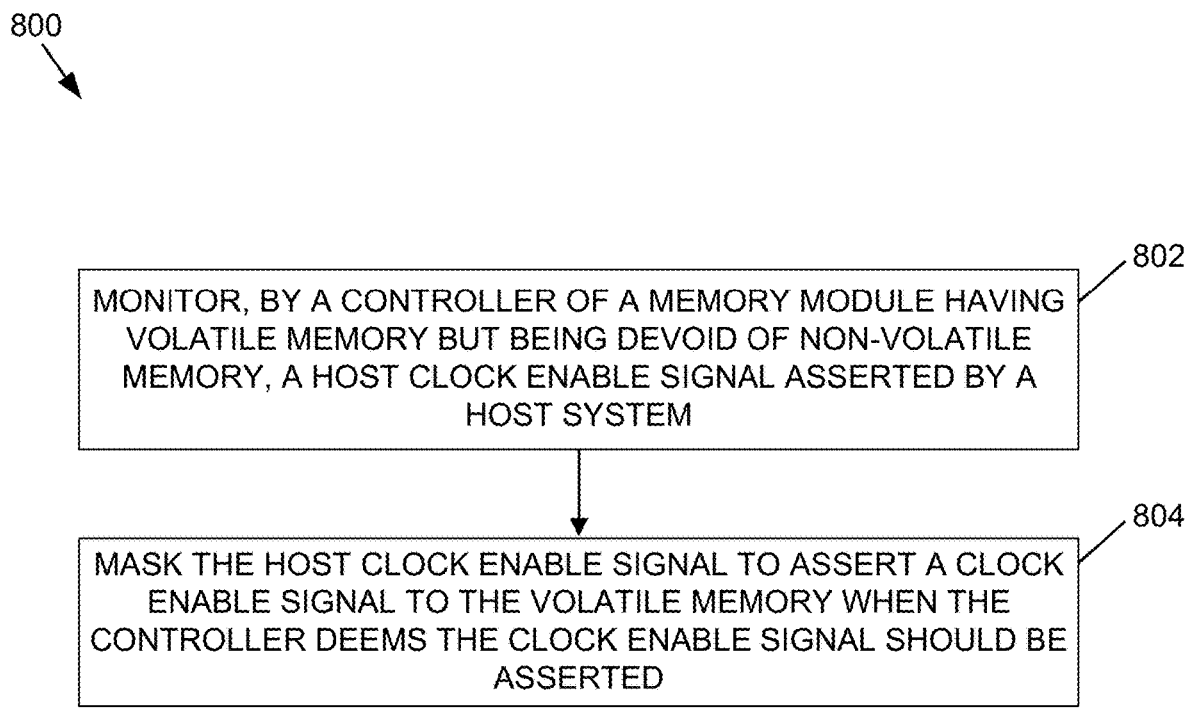
FIG. 8 is a diagram of another exemplary method of using an NVDIMM-NLC memory module according to some aspects described herein.

FIG. 8 is a diagram of another exemplary method 800 of using an NVDIMM-NLC memory module according to some aspects described herein. The exemplary method may be operational on a memory module that includes volatile memory but is devoid of non-volatile memory. The method may include monitoring, by an NVDIMM-NLC memory module, a host clock enable signal asserted by a host system 802. In some aspects, the controller causes the clock enable control logic circuit to monitor the host clock enable signal. The method may further include masking the host clock enable signal and asserting a clock enable signal to the volatile memory when the controller (i.e., the memory module controller) deems the clock enable signal should be asserted (not when the host system deems that the clock enable signal should be asserted) 804. For example, the NVDIMM-NLC memory module, or the on-module controller (414, FIG. 4) of the NVDIMM-NLC memory module, may be configured to hold the clock enable signal low during a power failure event to mask host system control of the clock enable signal to ensure that the volatile memory 408 remains in a self-refresh mode. In some aspects, the controller causes the clock enable control logic circuit to monitor a host clock enable signal and mask the host clock enable signal and assert a clock enable signal to the volatile memory device when the controller deems the clock enable signal should be asserted. In some aspects, a memory module controller causes the clock enable control logic circuit to monitor a host clock enable signal and mask the host clock enable signal and assert a clock enable signal to the volatile memory device when the memory module controller deems the clock enable signal should be asserted.

Figure 9:
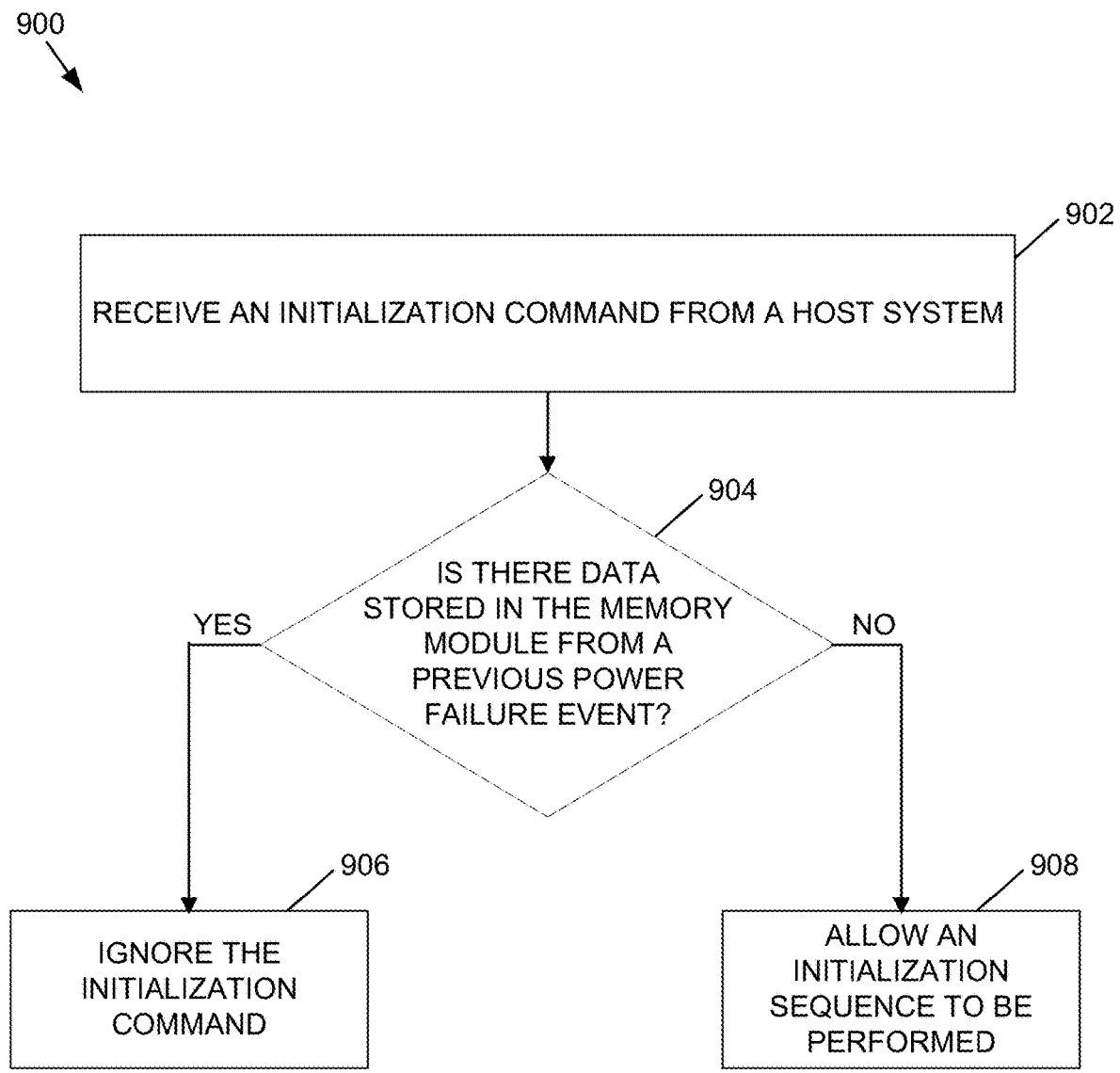
FIG. 9 is a diagram of another exemplary method of using an NVDIMM-NLC memory module according to some aspects described herein.

FIG. 9 is a diagram of another exemplary method 900 of using an NVDIMM-NLC memory module according to some aspects described herein. The exemplary method may be operational on a memory module that includes volatile memory but is devoid of non-volatile memory. The method may include receiving an initialization command from a host system 902. The initialization command may act to cause the NVDIMM-NLC memory module to clear data from its volatile memory. However, if data is stored in the volatile memory, and the initialization command follows a system power failure event, then the data would be lost. Accordingly, the NVDIMM-NLC memory module may be configured to determine if there is data stored in the volatile memory of the NVDIMM-NLC memory module from a previous power failure event 904. The NVDIMM-NLC memory module may then be configured to ignore the initialization command if there is data stored from a previous power failure event in the volatile memory device 906. Ignoring the initialization command may be performed unilaterally by the controller (e.g., on-module controller) of the NVDIMM-NLC memory module. On the other hand, the NVDIMM-NLC memory module may be configured to allow an initialization sequence to be performed on the volatile memory device if there is no data retained in the volatile memory device 908.

Figure 10:
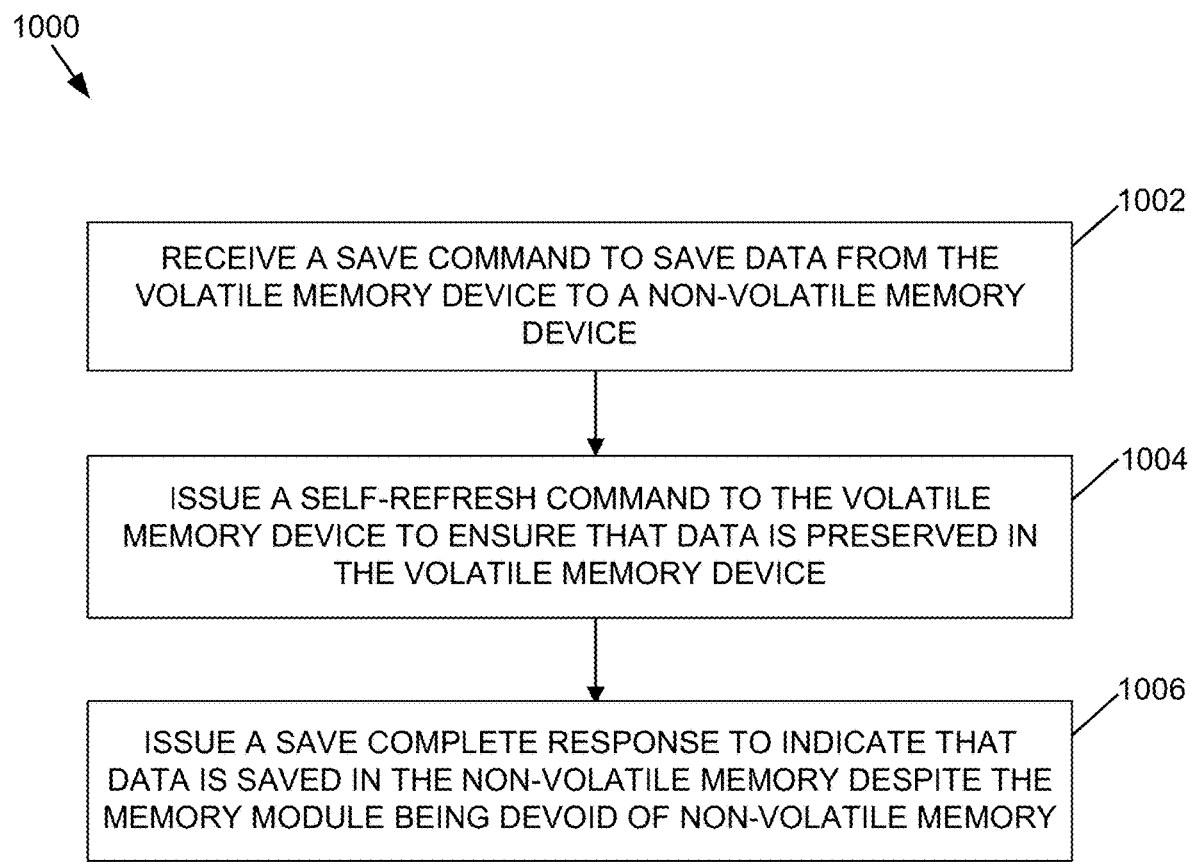
FIG. 10 is a diagram of another exemplary method of using an NVDIMM-NLC memory module according to some aspects described herein.

FIG. 10 is a diagram of another exemplary method 1000 of using an NVDIMM-NLC memory module according to some aspects described herein. The exemplary method may be operational on a memory module that includes volatile memory but is devoid of non-volatile memory. The method may include receiving, at the NVDIMM-NLC memory module, a save command to save data from the volatile memory device to non-volatile memory 1002. The save command may be issued by the host system, for example, at the start of a system power failure event. The save command may be in the form of an assertion of a signal indicative of the save command, such as the SAVE_N signal (413, FIG. 4). The SAVE_N signal may be present on an edge interface (410, FIG. 4) coupled to the host system. Upon receipt of the save command, or detection of a power failure event, the NVDIMM-NLC memory module (e.g., the controller of the NVDIMM-NLC memory module) may be configured to issue a self-refresh command to the volatile memory device to ensure that data is preserved in the volatile memory device 1004. The NVDIMM-NLC memory module (e.g., the controller of the NVDIMM-NLC memory module) may be further configured to issue a response (e.g., a SAVE_COMPLETE response or some other type of signal) to indicate that data is saved in the non-volatile memory, despite the NVDIMM-NLC memory module being devoid of non-volatile memory 1006.

Figure 11:
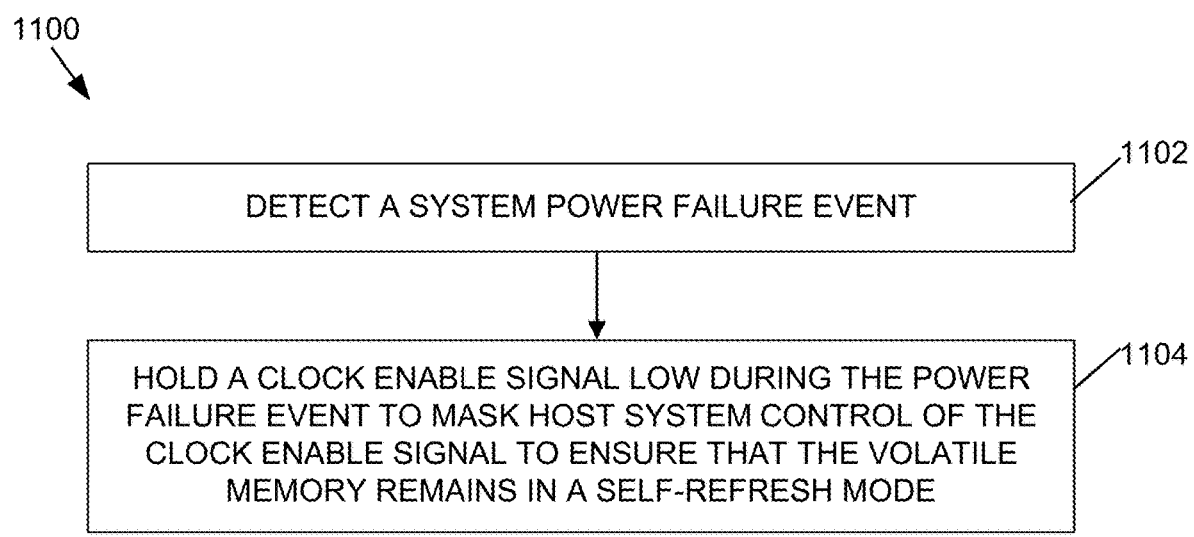
FIG. 11 is a diagram of another exemplary method of using an NVDIMM-NLC memory module according to some aspects described herein.

FIG. 11 is a diagram of another exemplary method 1100 of using an NVDIMM-NLC memory module according to some aspects described herein. The exemplary method may be operational on a memory module that includes volatile memory but is devoid of non-volatile memory. The method may include detecting a system power failure event 1102. In one aspect, the NVDIMM-NLC memory module may identify an assertion of a hardware interrupt signal on the edge interface to detect a start of the power failure event, wherein the hardware interrupt signal is used to command the memory module to transfer data from the volatile memory device to non-volatile memory despite the memory module being devoid of non-volatile memory. The method may further include holding a clock enable signal low during the power failure event to mask host system control of the clock enable signal to ensure that the volatile memory remains in a self-refresh mode 1104.

Figure 12:
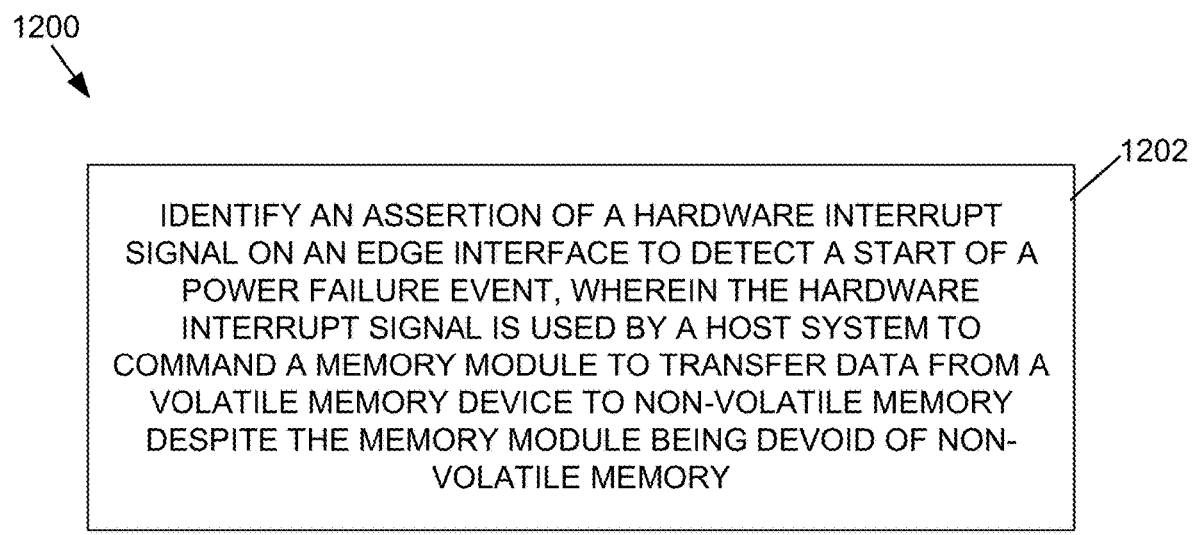
FIG. 12 is a diagram of another exemplary method of using an NVDIMM-NLC memory module according to some aspects described herein.

FIG. 12 is a diagram of another exemplary method 1200 of using an NVDIMM-NLC memory module according to some aspects described herein. The exemplary method may be operational on a memory module that includes volatile memory but is devoid of non-volatile memory. The method may include identifying an assertion of a hardware interrupt signal on an edge interface to detect a start of a power failure event, wherein the hardware interrupt signal is used by a host system to command a memory module to transfer data from a volatile memory device to non-volatile memory despite the memory module being devoid of non-volatile memory 1204.

Figure 13:
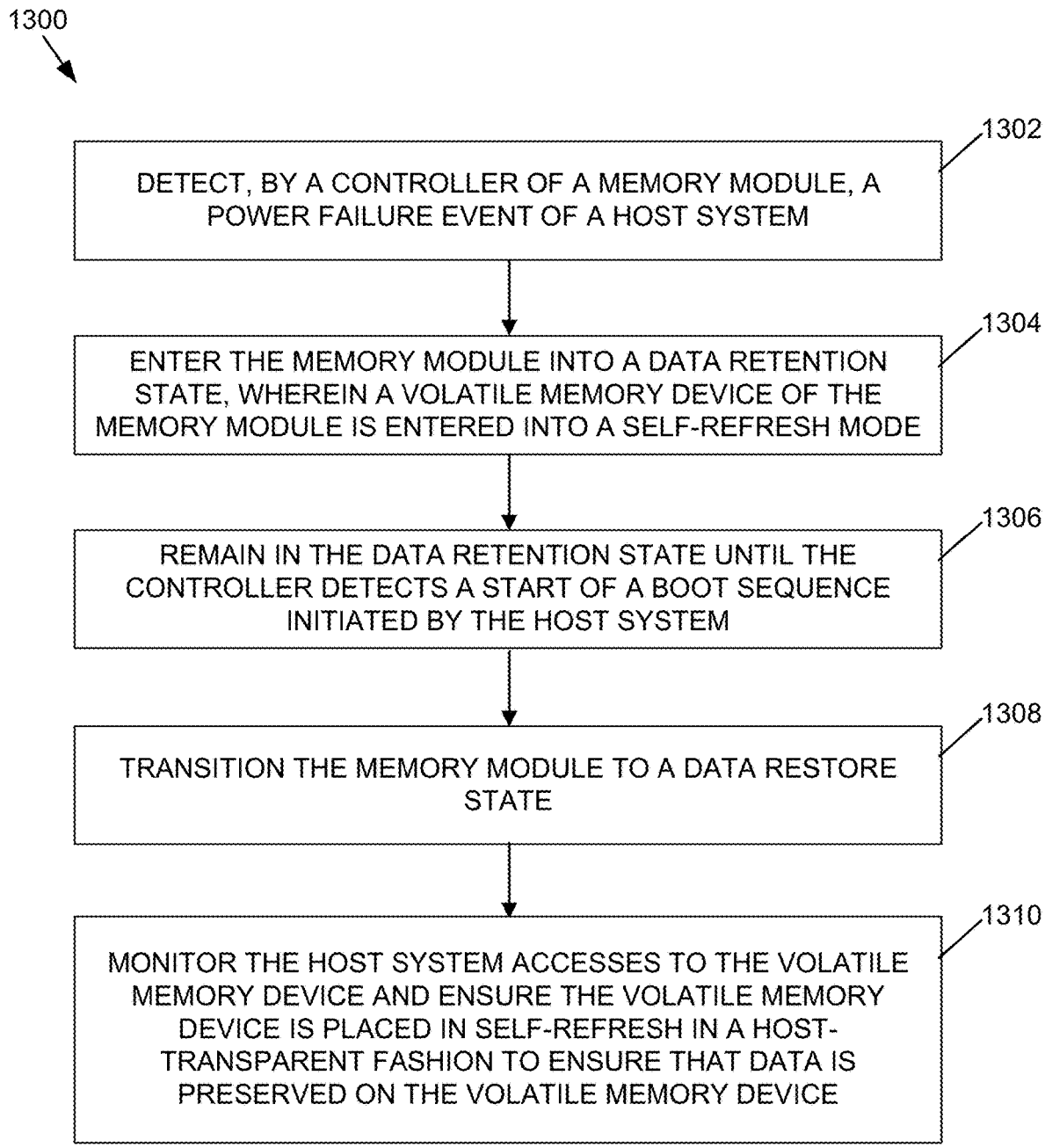
FIG. 13 is a diagram of another exemplary method of using an NVDIMM-NLC memory module according to some aspects described herein.

FIG. 13 is a diagram of another exemplary method 1300 of using an NVDIMM-NLC memory module according to some aspects described herein. The exemplary method may be operational on a memory module that includes volatile memory but is devoid of non-volatile memory. The method may include detecting, by a controller of the memory module, a power failure event of a host system 1302. After detection of the power failure event, entering the memory module into a data retention state, wherein the volatile memory device of the memory module is entered into a self-refresh mode 1304. Remaining in the data retention state until the controller detects a start of a boot sequence initiated by the host system 1306. Transitioning, by the controller, the memory module to a data restore state 1308. While in the data restore state, the controller is further configured to monitor the host system accesses to the volatile memory device and ensure the volatile memory device is placed in self-refresh in a host-transparent fashion to ensure that data is preserved on the volatile memory device 1310.

Figure 14:
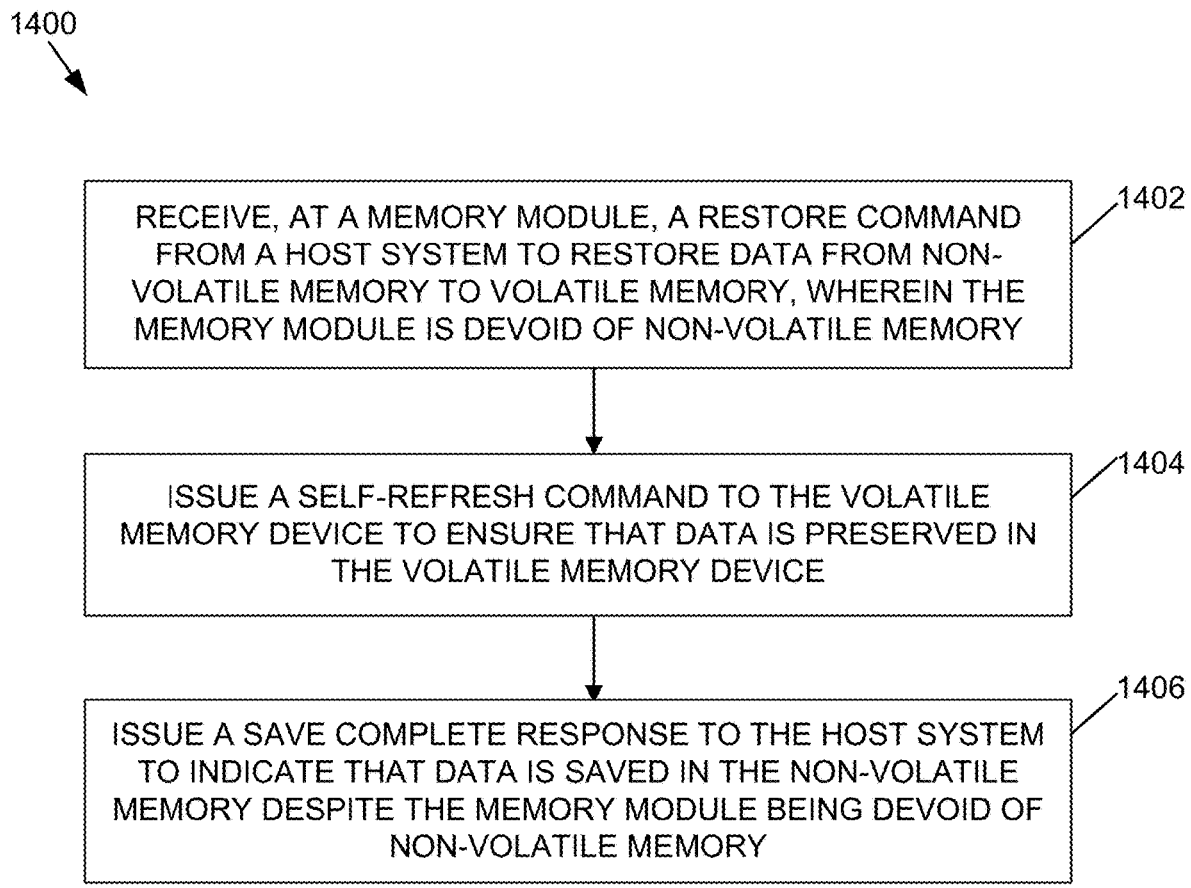
FIG. 14 is a diagram of another exemplary method of using an NVDIMM-NLC memory module according to some aspects described herein.

FIG. 14 is a diagram of another exemplary method 1400 of using an NVDIMM-NLC memory module according to some aspects described herein. The exemplary method may be operational on a memory module that includes volatile memory but is devoid of non-volatile memory. The method may include receiving, at the memory module, a restore command from a host system to restore data from non-volatile memory to volatile memory, wherein the memory module is devoid of non-volatile memory 1402. Issuing a self-refresh command to the volatile memory device to ensure that data is preserved in the volatile memory device 1404. Issuing a save complete response to the host system to indicate that data is saved in the non-volatile memory despite the memory module being devoid of non-volatile memory 1406.

In one or more aspects herein, a processing circuit includes at least one processing device, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A memory is a non-transitory memory device and may be an internal memory or an external memory, and the memory may be a single memory device or a plurality of memory devices. The memory may be a read-only memory, random access memory, volatile memory, non-volatile memory, static memory, dynamic memory, flash memory, cache memory, and/or any non-transitory memory device that stores digital information.

As may be used herein, the term "operable to" or "configurable to" or "configured to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, frequencies, wavelengths, component values, integrated circuit process variations, temperature variations, rise and fall times, and/or thermal noise. Such relativity between items ranges from a difference of a few percent to magnitude differences.

Note that the aspects of the present disclosure may be described herein as a process that is depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

What is claimed is:

1. A memory module, comprising:
    a substrate having an edge interface to couple to a host system;
    a backup energy source coupled to the substrate;
    a volatile memory device coupled to the substrate, coupled to the backup energy source, and configured to receive data from and transmit data to the host system via the edge interface; and
    a controller coupled to the edge interface, the backup energy source, and the volatile memory device, the controller configured to:
        emulate operations for non-volatile memory on the memory module, in response to an external host non-volatile memory command, while the memory module is devoid of such non-volatile memory; and
        wherein, upon receiving a save command to save data from the volatile memory device to non-volatile memory, the controller is further configured to:
            issue a self-refresh command to the volatile memory device to ensure that data is preserved in the volatile memory device; and
            issue a save complete response to indicate that data is saved in the non-volatile memory despite the memory module being devoid of non-volatile memory.

2. The memory module of claim 1, further comprising a clock enable control logic circuit coupled to the controller, the volatile memory device, and the edge interface, wherein the controller causes the clock enable control logic circuit to monitor a host clock enable signal and mask the host clock enable signal and assert a clock enable signal to the volatile memory device when the controller deems the clock enable signal should be asserted.

3. The memory module of claim 1, wherein, upon receiving an initialization command from the host system to initialize the volatile memory device, the controller is further configured to:
    ignore the initialization command if there is data stored from a previous power failure event in the volatile memory device; or
    allow an initialization sequence to be performed on the volatile memory device if there is no data retained in the volatile memory device.

4. The memory module of claim 1, wherein the controller is further configured to identify an assertion of a hardware interrupt signal on the edge interface to detect a start of a power failure event, wherein the hardware interrupt signal is used by a host system to command the memory module to transfer data from the volatile memory device to non-volatile memory despite the memory module being devoid of non-volatile memory.

5. The memory module of claim 1, wherein after detection of a power failure event the controller is further configured to enter the memory module into a data retention state, wherein the volatile memory device is entered into a self-refresh mode, and the memory module remains in the data retention state until the controller detects a start of a boot sequence initiated by the host system, wherein the controller is further configured to transition the memory module to a data restore state.

6. The memory module of claim 5, wherein while in the data restore state, the controller is further configured to monitor the host system accesses to the volatile memory device and ensure the volatile memory device is placed in self-refresh in a host-transparent fashion to ensure the data is preserved on the volatile memory device.

7. The memory module of claim 1, wherein, upon receiving a restore command from the host system to restore data from non-volatile memory to volatile memory, the controller is further configured to:
    ignore the restore command; and issue a restore complete response to indicate that the restore command was executed.

8. A memory module, comprising:

a substrate having an edge interface to couple to a host system;

a backup energy source coupled to the substrate;

a volatile memory device coupled to the substrate, coupled to the backup energy source, and configured to receive data from and transmit data to the host system via the edge interface; and a controller coupled to the edge interface, the backup energy source, and the volatile memory device, the controller configured to:

emulate operations for non-volatile memory on the memory module, in response to an external host non-volatile memory command, while the memory module is devoid of such non-volatile memory;

wherein, during a power failure event, the controller is further configured to:

hold a clock enable signal low during the power failure event to mask host system control of the clock enable signal to ensure that the volatile memory device remains in a self-refresh mode.

9. A method, operational at a memory module including a volatile memory device but being devoid of non-volatile memory, the method including:

detecting a start of a host system power failure event; and emulating operations for non-volatile memory on the memory module, in response to an external host non-volatile memory command, while the memory module is devoid of such non-volatile memory;

wherein after detecting a host system power failure event, entering the memory module into a data retention state, wherein the volatile memory device is entered into a self-refresh mode, and the memory module remains in the data retention state until the memory module detects a start of a boot sequence initiated by the host system, wherein the memory module is further configured to transition to a data restore state.

10. The method of claim 9, wherein the memory module further includes a clock enable control logic circuit, the method further comprising:

causing, by a memory module controller, the clock enable control logic circuit to monitor a host clock enable signal and mask the host clock enable signal and assert a clock enable signal to the volatile memory device when the memory module controller deems the clock enable signal should be asserted.

11. The method of claim 9, further comprising:

receiving an initialization command from a host system to initialize the volatile memory device, and ignoring the initialization command if there is data stored from a previous power failure event in the volatile memory device; or allowing an initialization sequence to be performed on the volatile memory device if there is no data retained in the volatile memory device.

12. The method of claim 9, further comprising:

receiving a save command to save data from the volatile memory device to non-volatile memory;

issuing a self-refresh command to the volatile memory device to ensure that data is preserved in the volatile memory device; and issuing a save complete response to indicate that data is saved in the non-volatile memory despite the memory module being devoid of non-volatile memory.

13. The method of claim 9, further comprising:

holding a clock enable signal low during a host system power failure event to mask host system control of the clock enable signal to ensure that the volatile memory device remains in a self-refresh mode.

14. The method of claim 9, wherein while in the data restore state, the method further comprising:

monitoring the host system accesses to the volatile memory device and ensuring the volatile memory device is placed in self-refresh in a host-transparent fashion to ensure data is preserved on the volatile memory device.

15. The method of claim 9, wherein, upon receiving a restore command from a host system to restore data from non-volatile memory to the volatile memory device, the method further comprising:

ignoring the restore command; and issuing a restore complete response to indicate that the restore command was executed.

16. A method, operational at a memory module including a volatile memory device but being devoid of non-volatile memory, the method including:

detecting a start of a host system power failure event; and emulating operations for non-volatile memory on the memory module, in response to an external host non-volatile memory command, while the memory module is devoid of such non-volatile memory; and identifying an assertion of a hardware interrupt signal on an edge interface to detect the start of the host system power failure event, wherein the hardware interrupt signal is used to command the memory module to transfer data from the volatile memory device to non-volatile memory despite the memory module being devoid of non-volatile memory.

\* \* \* \* \*